(12) United States Patent
Kim

(10) Patent No.: US 9,031,906 B2
(45) Date of Patent: May 12, 2015

(54) METHOD OF MANAGING DATA IN ASYMMETRIC CLUSTER FILE SYSTEM

(71) Applicant: Electronics and Telecommunications Research Institute, Daejeon (KR)

(72) Inventor: Soo-Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 194 days.

(21) Appl. No.: 13/684,903

(22) Filed: Nov. 26, 2012

(65) Prior Publication Data

US 2013/0332418 A1  Dec. 12, 2013

(30) Foreign Application Priority Data

Jun. 8, 2012  (KR) .................. 10-2012-0061572

(51) Int. Cl.
*G06F 17/30* (2006.01)

(52) U.S. Cl.
CPC .... *G06F 17/30283* (2013.01); *G06F 17/30224* (2013.01); *G06F 17/30091* (2013.01)

(58) Field of Classification Search
CPC ....... G06F 17/30067; G06F 8/61; G06F 9/52; G06F 21/53; G06F 9/45537; G06F 9/468; G06F 9/4856; G06F 9/5011; G06F 9/541; G06F 9/545; G06F 17/30212; G06F 17/30144; G06F 11/1435; G06F 17/3023
USPC ............. 707/E17.01, 999.01, 999.2, 999.001, 707/999.202, E17.005, E17.032, 827, 610, 707/822, 999.201, 999.204, E17.044, 707/999.203, 609, 625, 634, 705, 999.009, 707/999.1, 999.205, E17.001, E17.006, 707/E17.007, 639, 655, 657, 665, 666, 667, 707/687, 693, 695, 758, 771, 781, 802, 831, 707/955, 959, 999.008, 999.104; 709/203, 709/213, 219, 226, 201, 204, 205, 216, 217, 709/218, 220, 223, 224, 225, 227, 229, 230, 709/246, 248; 711/162, 170, 100, 216, 711/E12.001, E12.009, E12.103, 1, 103, 711/112, 117, 147, 154, 164, 165, 169, 202
See application file for complete search history.

(56) References Cited

U.S. PATENT DOCUMENTS 6,854,072 B1 * 2/2005 Cagle et al. ..................... 714/15
7,546,321 B2 * 6/2009 Uppala ............................... 1/1
7,836,017 B1  11/2010 Srinivasan et al.

(Continued)

FOREIGN PATENT DOCUMENTS

KR   10-2011-0070659   6/2011

OTHER PUBLICATIONS

S. Shepler et al., Internet Engineering Task Force (IETF), "Network File System (NFS) Version 4 Minor Version 1 Protocol", IETF RFC 5661, NFSv4.1, Jan. 2010, pp. 277-334, (Total pp. 617).

*Primary Examiner* — Jay Morrison
*Assistant Examiner* — Ken Hoang
(74) *Attorney, Agent, or Firm* — Staas & Halsey LLP

(57) ABSTRACT

Disclosed herein is a method of managing data in an asymmetric cluster file system. In this method, if an OPEN request for the opening of an absent file has been received, a metadata server assigns a file handle value and a file name and then generates a file in a data server. Thereafter, the metadata server copies a file stored in the data server or the generated file to one or more data servers based on a preset copying level. Thereafter, a client performs a file operation on the files stored in the data servers.

18 Claims, 15 Drawing Sheets

(56) References Cited

U.S. PATENT DOCUMENTS

| | | |
|---|---|---|
| 7,953,830 B2 * | 5/2011 | Foster et al. .................. 709/221 |
| 8,495,625 B1 * | 7/2013 | Sanders ........................ 717/177 |
| 2004/0111390 A1 | 6/2004 | Saito et al. |
| 2006/0041718 A1 * | 2/2006 | Ulrich et al. .................. 711/114 |
| 2008/0034077 A1 * | 2/2008 | Takashige et al. ............ 709/223 |
| 2009/0271412 A1 * | 10/2009 | Lacapra et al. ................. 707/10 |
| 2011/0016085 A1 * | 1/2011 | Kuo et al. ..................... 707/615 |
| 2011/0153570 A1 | 6/2011 | Kim |
| 2011/0258488 A1 * | 10/2011 | Nightingale et al. .......... 714/15 |

* cited by examiner

METHOD OF MANAGING DATA IN ASYMMETRIC CLUSTER FILE SYSTEM

CROSS REFERENCE TO RELATED APPLICATION

This application claims the benefit of Korean Patent Application No. 10-2012-0061572, filed on Jun. 8, 2012, which is hereby incorporated by reference in its entirety into this application.

BACKGROUND OF THE INVENTION

1. Technical Field

The present invention relates generally to a method of managing data in an asymmetric cluster file system and, more particularly, to a method of managing data in an asymmetric cluster file system, which configures and reconfigures device and file layouts in situations, such as the situation after copying of data and the situation of addition of a data server in order to prepare for the failure of a data server in the asymmetric cluster file system in which a data distribution pattern is fixed, thereby offering a solution to the failures of the data servers.

2. Description of the Related Art

An asymmetric cluster file system is a system that separately manages the actual data of each file and the metadata thereof, that is, the attribute information of the file. In this case, the actual data of the file is distributed and stored among a plurality of data servers and the metadata thereof is managed by a metadata server. For this purpose, as shown in FIG. 1, an asymmetric cluster file system is configured in a distributed structure such that a metadata server 10 and a plurality of data server 20 are connected over a network 30.

A client first accesses the metadata of an actual data file stored in the metadata server 10 in order to access actual data. The client 40 collects information about the plurality of data servers 20 in which the actual data has been stored, via the metadata. The client 40 accesses the plurality of data servers 20 in which the actual data has been stored using the collected information, and then performs the task of inputting or outputting the actual data.

Meanwhile, if there occurs a failure in the data server 20 of the asymmetric cluster file system or a failure in the network 30, the client 40 cannot perform the tasks of inputting and outputting the desired actual data. In order to overcome this problem, copies of the actual data stored in the data server 20 are stored in some other data servers 20. In this case, it is common to distribute, store and manage two or more copies among different data servers 20 while taking into consideration the data storage cost. This also provides an advantage in which the asymmetric cluster file system maintains copies across the multiple data servers 20, thereby distributing the access load imposed by the client 40. As an example, Korean Patent Application Publication No. 10-2011-0070659 entitled "Method of Copying and Restoring Data in Asymmetric Cluster Distribution File System" discloses a method of copying and restoring data in an asymmetric cluster distribution file system, in which a main partition and a subsidiary partition are separated from each other in a data server and a main chunk and a subsidiary chunk are separated and managed, thereby efficiently processing the copying and restoration of chunks.

In this case, the asymmetric cluster file system should maintain a predetermined number of copies of each of data chunks stored in a failed data server 20 when the failure of the data server 20 is detected. Otherwise it may be impossible to access the corresponding data when the consecutive failures of the data server 20 occur, and thus it is necessary to keep track of the data stored in the failed data server 20 and copy it to some other data servers 20.

Here, the asymmetric cluster file system divides each file into sections having a predetermined logical size. These sections are referred to as "logical chunks." That is, a file is a set of sequential logical chunks. Furthermore, the actual data of the file is divided into chunks, and these chunks are distributed and stored among the plurality of data servers 20. These chunks are referred to as "data chunks."

The metadata server 10 of the asymmetric cluster file system supports an arbitrary data distribution pattern for each file. That is, the asymmetric cluster file system stores and manages the address of the data server 20 in which a data chunk has been stored, for each logical chunk of the file. Accordingly, the client 40 accesses the data server 20 in which each logical chunk has been stored, and then performs an input or output task.

However, the metadata server 10 of some asymmetric cluster file system supports only a fixed data distribution pattern for each file. That is, the metadata server 10 does not manage the address of the data server 20 in which a data chunk for each logical chunk of the file has been stored, but stores and manages only a list and the sequence of the addresses of the data servers 20 in which data chunks have been stored, and the index of the data server 20 in which a first data chunk has been stored. Accordingly, the client 40 performs an input or output task after accessing the data servers 20 in the sequence of the list of the data servers 20 in which data chunks have been stored, which starts from the data server 20 in which the first data chunk has been stored.

Although a symmetric cluster file system that supports logical chunks into which each file has been divided can more efficiently manage the data servers 20, it is problematic in that the size of the metadata of each file increases when the size of the file is large or the size of chunks is small, so that the amount of content that should be managed by the metadata server 10 becomes large and the amount of content that will be exchanged with the client 40 also becomes large, thereby imposing excessive load on the overall system.

In contrast, although an asymmetric cluster file system that supports a data distribution pattern can minimize the load of the overall system even when the size of a file is large or the size of chunks is small, it is problematic in that it is difficult to efficiently manage the data servers 20.

The most representative example of an asymmetric cluster file system that supports only a fixed data distribution pattern for each file is a file system based on the version 4.1 protocol standard of a Network File System (NFS) that is the most popularized and widely used. The NFS version 4.1 protocol standard was officially established as Request for Comments (RFC) 5661 in January of 2010 by the Internet Engineering Task Force (IETF) that established and managed numerous Internet-related standards worldwide.

The NFS version 4.1 protocol standard includes, when a protocol-based asymmetric cluster file system is configured, the Parallel NFS (pNFS) protocol used between the client 40 and the metadata server 10 and the representative file layout-type storage protocol used between the client 40 and the data servers 20.

The file layout-type protocol is advantageous in that the construction, control and management of the data servers 20 are easy because it uses NFS-based servers as the data servers 20 and can thus provide a file-based environment that is most familiar to common users. However, the NFS version 4.1 protocol standard stipulates that a control protocol used between the metadata server 10 and the data servers 20 and between the data servers 20 is outside the range of the standard, and does not set it forth. When an asymmetric cluster file system based on the NFS version 4.1 protocol is constructed, a control protocol that is used for the asymmetric cluster file system is required.

A method by which a client performs an operation on a file in an asymmetric cluster file system that supports a layout-type file system protocol will be described with reference to FIGS. 2 and 3.

It is assumed that a client 40 performs a write or read operation on file A 50 that is logically composed of D_1 51 to D_n+2 56.

The client 40 sends an OPEN request (that is, OPEN(A)) to a metadata server 10 in order to perform a read or write operation on file A 50 at step S10. The metadata server 10 prepares metadata for the corresponding file and sends a response, including the file handle value (filehandle=a_0) of the corresponding file, to the client 40 at step S11.

The client 40 sends a LAYOUT_GET request, including the file handle value a_0 received from the metadata server 10, (that is, LAYOUT_GET a_0) to the metadata server 10 in order to find the locations of data chunks for the logical chunks of the file at step S12. The metadata server 10 sends a response, including the ID value of a device (dev_id=1) in which a file having the corresponding file handle value a_0 has been stored and also including file layout information, that is, a list of the file handle values that are managed by the data servers 20a, 20b, 20c and 20d storing the data chunks (that is, filehandle={a_1, a_2, ..., a_n}), to the client 40 at step S13. Meanwhile, if the client 40 has become aware of the file layout information, this step is not performed.

The client 40 sends a DEVICE_INFO request, including device ID value (that is, 1) received from the metadata server 10, (that is, DEVICE_INFO(1)) to the metadata server 10 in order to find detailed information about the device ID value received from the metadata server 10 at step S14. The metadata server 10 sends a response, including device information having the corresponding device ID value (that is, 1), to the client at step S15. Meanwhile, if the client 40 has become aware of the detailed information about the device ID value, this step is not performed. Here, the device information includes a list of the addresses of data servers in which data chunks for respective logical chunks have been stored (that is, multipath list=[{DS_1}, {DS_2}, ..., {DS_n}]), the stripe sequence of a list of data servers in which logical chunks have been stored (that is, stripeindices={0, 1, ..., n−1}), and the index value of a data server in which a first logical chunk has been stored (that is, first_stripe_index=0).

The client 40 derives the address of each data server and a file handle value in the data server from the integration of the response, including the file layout information received from the metadata server 10, (that is, the response at step S13) and the response, including the device information, (that is, the response at step S15). This enables the client 40 to send a write or read request, including the corresponding file handle value, the offset and size of a corresponding logical chunk and actual data content, to each data server in order to write or read actual data at steps S16, S18, S20, S22, S24 and S26.

In this case, values corresponding to the indices of the stripe sequence of the list of the data servers (stripeindices={0, 1, ..., n−1}) in which the logical chunks have been stored, in the file handle value list (filehandle list={a_1, a_2, ..., a_n}) included in the file layout information, are used as the file handle values to be sent to the data servers 20a, 20b, 20c and 20d, and the index value of the data server in which the first logical chunk has been stored (firststripe_index=0) starts to be referred to. Furthermore, each data server performs a corresponding operation and sends a response, including the results of the performance, to the client 10 at steps S17, S19, S21, S23, S25 and S27.

Referring to FIG. 2, since the value of a data server index at which a first logical chunk has been stored (first_stripe_index) is 0, the client 40 determines {DS_1}, which is the first value of the list of the addresses of data servers in which data chunks for respective logical chunks have been stored (multipath list=[{DS_1}, {DS_2}, ..., {DS_n}]). Then the client 40 accesses data server 1 20a, and performs a write or read operation. Furthermore, the client 40 sequentially accesses data servers stored at the corresponding indices of a list of the addresses of the data servers (multipath list=[{DS_1}, {DS_2}, ..., {DS_n}]) in which the data chunks for the logical chunks have been stored in the stripe sequence of the list of the data servers in which the logical chunks have been stored (stripeindices={0, 1, ..., n−1}), and sends a write or read operation requests to the corresponding data server at steps S16, S18, S20, S22 and S24.

The values of the corresponding indices of the file handle value list (filehandle list={a_1, a_2, ..., a_n}) in the file layout information are used as the file handle values to be sent to the data servers 20. Furthermore, the write or read operation of the client 40 on a file is repeated based on the stripe sequence of a list of the data servers in which logical chunks have been stored (stripeindices={0, 1, ..., n−1}) depending on the size of the file until all operation is completed. That is, if there remains a write or read task to be performed after the client 40 had sent a write or read operation request to a data server at the last position of the stripe sequence of the list of the data servers in which the logical chunks have been stored at step S22 and then has received a response thereto at step S23, the client 40 sequentially accesses the data servers in the list of the data servers in which the logical chunks have been stored in the stripe sequence starting from the first data server, sends a write or read operation request at steps S24 and S26, and receives responses, including the results of the operation, at steps S25 and S27.

Once the client 40 has completed the write operation, it sends a LAYOUT_COMMIT request, including information about the completion and the file handle value a_0 of the corresponding file, (that is, LAYOUT_COMMIT a_0) to the metadata server 10 at step S28. The metadata server 10 updates the metadata information of the corresponding file while referring to the information about the completion received from the client 40 and then sends a response, including the results of the updating, to the client 40 at step S29.

If the client 40 does not need to access file A 50 any longer, it sends a CLOSE request, including the file handle value a_0 of the corresponding file, (that is, CLOSE(a_0)) to the metadata server 10 at step S30. The metadata server 10 performs the task of updating the metadata information of the corresponding file and the task of returning system resources and then sends a response, including the results of the performance, to the client 40 at step S31.

As described above, the asymmetric cluster file system that supports the layout-type file system protocol presents data server multipathing in the storage protocol used between the client 40 and the metadata server 10 to be used in case of the failures of the data servers 20, but does not present a specific solution to the failures of the data servers 20.

The data server multipathing will now be described in detail. When the metadata server 10 responds to a DEVICE_INFO request from the client 40, it may make multiplicate a list of the addresses of the data servers 20 in which data chunks for respective logical chunks have been stored (multipath list=[{DS_1}, {DS_2}, ..., {DS_n}]), which is selected from corresponding device information, and transfer it. For example, in the above-described example, the client 40 can access only data server 1 20a because the address of the first data server 20 is described as being only {DS_1}. When the address of the first data server 20 is made multiplicate and described as being {DS_1, DS_2, DS_n}, the client 40 can access data server 1 20a, data server 2 20b and data server n 20d in which a data chunk for a first logical chunk is present, and perform a write or read operation using the first file handle value a_1 of the file handle value list.

However, the load of synchronizing file handle values may occur because the same file handle value must be used when the multiplicate data servers 20 are accessed, and additional high load may occur when the task of copying data to prepare for the failures of the data servers 20 is performed.

Since the asymmetric cluster file system that supports a layout-type file system protocol does not present a control protocol used between the metadata server 10 and the data servers 20 and between the data servers 20, an effective control protocol used between the metadata server 10 and the data servers 20 and between the data servers 20 is required for the metadata server 10 to control the data servers 20.

Furthermore, the asymmetric cluster file system that supports a layout-type file system protocol does not present a specific solution that prepares for the failures of the data servers 20. As a result, there is a need for an effective method capable of overcoming this problem while complying with the system protocol. Because of the above-described difference between the data distribution pattern schemes, a method different from a data copying method that is used in a general asymmetric cluster file system is required.

SUMMARY OF THE INVENTION

Accordingly, the present invention has been made keeping in mind the above problems occurring in the prior art, and an object of the present invention is to provide a method of managing data in an asymmetric cluster file system, in which a metadata server effectively controls data servers in the asymmetric cluster file system, thereby configuring or reconfiguring device and file layouts in situations such as the situation after copying of data, and the situation of addition of a data server, in order to prepare for the failures of the data servers. That is, an object of the present invention is to provide a method of managing data in an asymmetric cluster file system, in which a metadata server effectively controls data servers in the asymmetric cluster file system, thereby configuring file access information (device and file layouts) in advance in order to prepare for the failures of the data servers, reconfiguring the file layout after copying data, reconfiguring file access information when the failure of the data server is detected, reconfiguring the file layout after restoring data in order to meet a desired copying level, and reconfiguring file access information when a data server is added in order to restore data parallelism.

In order to accomplish the above object, the present invention provides a method of managing data in an asymmetric cluster file system, including, if an OPEN request for opening of an absent file has been received, assigning, by a metadata server, a file handle value and a file name and generating, by the metadata server, a file in a data server; copying, by the metadata server, a file stored in the data server or the generated file to one or more data servers based on a preset copying level; and performing, by a client, a file operation on the files stored in the data servers.

The method may further include, if an OPEN request has been received from the client and a file corresponding to the OPEN request is not present in the metadata server and the data servers, assigning, by the metadata server, a file handle value and file name of the file; sending, by the metadata server, an MDS2DS_OPEN request, including the assigned file name, to a plurality of data servers; and generating, by the data servers having received the MDS2DS_OPEN request, files using the file name included in the MDS2DS_OPEN request.

The generating files may include sending, by the data servers having generated the files, responses, including file handle values of the generated files, to the metadata server; and managing, by the metadata server, the file handle values included in the responses received from the plurality of data servers so that they are associated with the assigned file handle value.

The copying a file stored in the data server or the generated file to another data server may include detecting, by the metadata server, multiplicate data server addresses corresponding to an n-th data server index value on which a write operation has been performed from information about devices in which a copying target file has been stored; sending, by the metadata server, an MDS2DS_COPY request, including a source data server, a target data server, a name of the copying target file and a list of indices of data chunks to be copied, to the source data server and the target data server based on the detected multiplicate data server addresses; sending, by the source data server and the target data server having received the MDS2DS_COPY request, responses, including a handle value corresponding to the name included in the MDS2DS_COPY request, to the metadata server; copying, by the source data server and the target data server, the file stored in the source data server to the target data server; sending, by the source data server and the target data server, a DS2MDS_COPY_DONE request, including information about success or failure of the copying of the file, to the metadata server; and updating, by the metadata server, a file handle value list of the copied file.

The detecting a multiplicate data server address may include detecting, by the metadata server, a file that does not meet the preset copying level; detecting, by the metadata server, a device in which the detected file has been stored; detecting, by the metadata server, a file handle value list of the detected file; detecting, by the metadata server, multiplicate data server addresses included in the detected device; and detecting, by the metadata server, multiplicate file handle values corresponding to the detected multiplicate data server addresses.

The sending an MDS2DS_COPY request may include setting, by the metadata server, a data server corresponding to a valid file handle value selected from among the detected multiplicate file handle values as the source data server; and setting, by the metadata server, a data server corresponding to an invalid file handle value selected from among the detected multiplicate file handle values as the target data server.

The performing a file operation may include receiving, by the client, a multiplicate file handle value list and multiplicate data server addresses from the metadata server; detecting, by the client, multiplicate data server addresses and a multiplicate file handle value list corresponding to logical chunks that are selected as operation targets; and performing, by the client, an operation on a file based on the detected multiplicate data server addresses and multiplicate file handle value list; wherein the performing an operation may include, if the operation is a write operation, detecting, by the client, an n-th data server address, at which the write operation will be performed, from the detected multiplicate data server address list, and an n-th file handle value from the detected multiplicate file handle value list; and, if the operation is a read operation, detecting, by the client, a valid file handle value from the detected multiplicate file handle value list, and a data server address corresponding to the detected valid file handle value.

The method may further include deleting, by the metadata server, a file stored in the data server in response to a request for deletion of the file from the client; wherein the deleting a file may include detecting, by the metadata server, a file name from a REMOVE request received from the client; detecting, by the metadata server, a file name corresponding to the detected file name from each of the data servers; sending, by the metadata server, an MDS2DS_REMOVE request, including the detected file name in each of the data servers, to the each of the data servers; and integrating, by the metadata server, results of deleting the file received from the each of the data servers and sending, by the metadata server, a response, including final results, to the client.

The method may further include copying a copying target file stored in a source data server to a target data server; wherein the copying a copying target file to a target data server may include sending, by the metadata server, an MDS2COPY request, including source data server information, target data server information, a name of the copying target file, and a list of indices of data chunks to be copied, to the source data server and the target data server; sending, by each of the source data server and the target data server having received the MDS2COPY request, a response, including a file handle value of the copying target file in the each of the source data server and the target data server, to the metadata server; sending, by the source data server, a DS2DS_OPEN request, including the name of the copying target file, to the target data server; opening, by the target data server having received the DS2DS_OPEN request, a file corresponding to the name of the copying target file name included in the DS2DS_OPEN request, and sending, by the target data server having received the DS2DS_OPEN request, a response, including a file handle value of the corresponding file, to the source data server; sending, by the source data server having received the response, a DS2DS_WRITE request, including the file handle value received from the target data server and content of data chunks corresponding to the list of the indices of the data chunks to be copied, to the target data server; storing, by the target data server having received the DS2DS_WRITE request, the content of the data chunks included in the DS2DS_WRITE request, in a file corresponding to the file handle value included in the DS2DS_WRITE request; storing, by the target data server, results of storing the content of the data chunks in the source data server; sending, by the source data server, a signal indicative of completion of the copying of the data chunks, including file handle values in the source data server and the target data server, to the metadata server; and sending, by the metadata server having received the signal indicative of completion of the copying, a response to the source data server and the target data server.

The method may further include adding, by the metadata server, a data server to the asymmetric cluster file system; wherein the adding a data server may include sending, by the data server to be added, a registration request signal, including a data server ID value and an available capacity; storing, by the metadata server having received the registration request signal, the data server ID value and the available capacity included in the registration request signal and sending, by the metadata server having received the registration request signal, results of the storage; sending, by the data server to be added and having received the results of the storage, a DS2MDS_REPORT signal, including a status value of the current data server; storing, by metadata server having received the DS2MDS_REPORT signal, the status value stored in the DS2MDS_REPORT signal; and sending, by the metadata server having received a DS2MDS_REPORT signal, a response to the data server to be added.

The method may further include generating, by the metadata server, a new file in the data server; wherein the generating a new file may include assigning, by the metadata server having received the OPEN request from the client, a file handle value of the new file and a file name to be used in the data server; sending, by the metadata server, an MDS2DS_OPEN request, including the assigned file name, to n-th data servers of a multiplicate data server list selected from among data server lists included in a device; generating, by each of the data servers having received the MDS2DS_OPEN request, a file using a file name included in the MDS2DS_OPEN request; sending, by the each of the data servers, a file handle value of the generated file to the metadata server; and managing, by the metadata server, the received file handle values so that they are associated with the generated file handle values.

In order to accomplish the above object, the present invention provides a method of managing data when a failure occurs in an asymmetric cluster file system, including detecting, by a metadata server, a failed data server from among a plurality of data servers; updating, by the metadata server, multiplicate data server addresses including the failed data server; updating, by the metadata server, a multiplicate file handle value list including the failed data server; and updating, by the metadata server, device information based on the updated multiplicate data server addresses and the updated multiplicate file handle value list.

The updating multiplicate data server addresses may include detecting, by the metadata server, a device including the failed data server; detecting, by the metadata server, the multiplicate data server addresses including an address of the detected data server from device information of the detected device; and updating, by the metadata server, the detected address of the data server selected from among the detected multiplicate data server addresses to an invalid value.

The updating a multiplicate file handle value list may include detecting, by the metadata server, a device including the failed data server; detecting, by the metadata server, a multiplicate file handle value list including a file handle value of the detected data server from device information of the detected device; and updating, by the metadata server, a file handle value corresponding to the detected data server in the detected multiplicate file handle value list, to an invalid value.

The updating device information may include reconfiguring, by the metadata server, the device information by replacing a valid value of the multiplicate data server addresses in which an n-th value on which a write operation will be performed has been updated to an invalid value in the multiplicate data server addresses, with the n-th value; reconfiguring, by the metadata server, the device information by replacing a valid value of multiplicate file handle values in which an n-th value has been updated to an invalid value in the multiplicate file handle value list, with the n-th value; assigning, by the metadata server, a device ID value of the reconfigured device information; and updating, by the metadata server, a device ID value of each file, including a device corresponding to the assigned device ID value, to the assigned device ID value.

The method may further include updating, by the metadata server, the device information based on an added data server;

wherein the updating the device information based on an added data server may include detecting, by the metadata server, addition of the data server; detecting, by the metadata server, a device whose number of data servers has be reduced because of a failure of a data server; detecting, by the metadata server, n-th data server address values on which a write operation will be performed, from a multiplicate data server list included in device information of the detected device; detecting, by the metadata server, redundant data server address values from the detected n-th data server address values; replacing, by the metadata server, n-th data server address values of the redundant data server address values with a data server address value of the added data server; reconfiguring, by the metadata server, (n+1)-th data server address values of the multiplicate data server list based on the resulting n-th data server address values; and assigning, by the metadata server, a device ID of the reconfigured device information.

The reconfiguring an (n+1)-th data server address value may include reconfiguring, by the metadata server, the (n+1)-th data server address values so that data server address values immediately subsequent to the resulting n-th data server address values are set as the (n+1)-th data server address values.

The method may further include copying, by the metadata server, files to the added data server based on the updated device information; wherein the copying a file to the added data server may include detecting, by the metadata server, multiplicate data servers, including a data server address of the added data server; setting, by the metadata server, one of the detected multiplicate data servers as a source data server; setting, by the metadata server, the added data server as a target data server; and copying, by the metadata server, files stored in the source data server to the target data server.

The copying files to the target data server may include copying data chunks to the target data server; and the copying data chunks to the target data server may include detecting, by the metadata server, logical chunks of the files that are managed by the source data server; sending, by the metadata server, a request for copying data chunks corresponding to the detected logical chunks to the source data server and the target data server; detecting, by the metadata server, a file handle value corresponding to the added data server from a response to the request for copying received from the target data server; and updating, by the metadata server, a file handle value of file layout information of the files corresponding to the added data server with the detected file handle value.

The copying data chunks to the target data server may further include updating, by the metadata server, a device ID value of the copied files with the device ID value.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Embodiments of the present invention will be described with reference to the accompanying drawings in order to fully describe the present invention so that persons having ordinary skill in the art can easily practice the technical spirit of the present invention. It should be noted that like reference symbols are used to designate like elements throughout the drawings even when the elements are illustrated in different drawings. Furthermore, in the following description of the present invention, detailed descriptions of one or more related well-known constructions and/or one or more functions which have been deemed to make the gist of the present invention unnecessarily vague will be omitted.

A method of managing data in an asymmetric cluster file system according to an embodiment of the present invention will be described in detail below with reference to the accompanying drawings.

Figure 1:
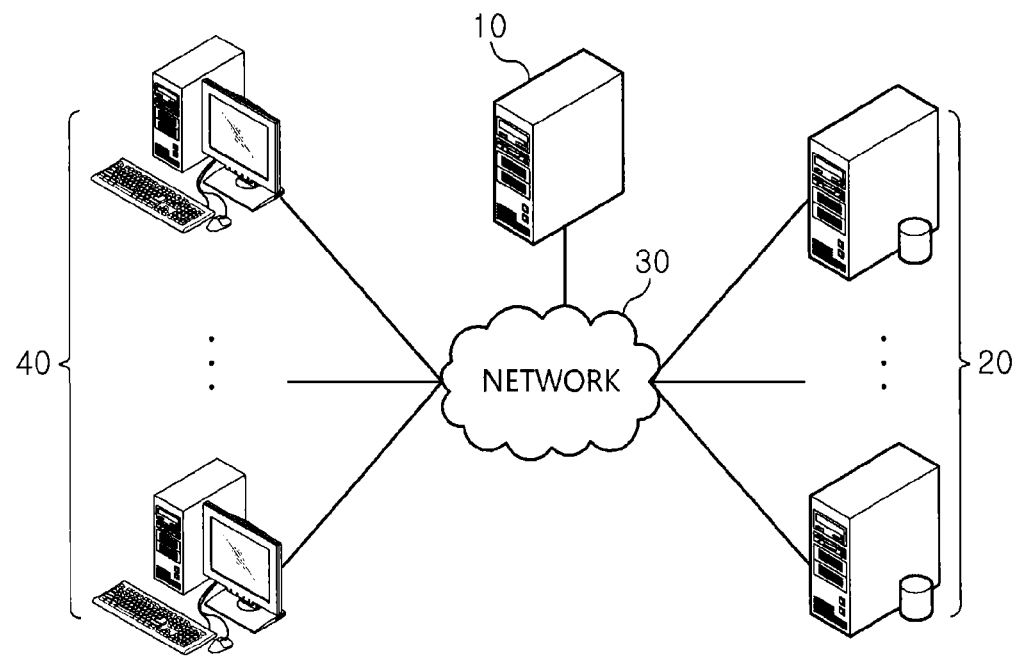
FIGS. 1 to 3 are diagrams illustrating a conventional asymmetric cluster file system.
Figure 2:
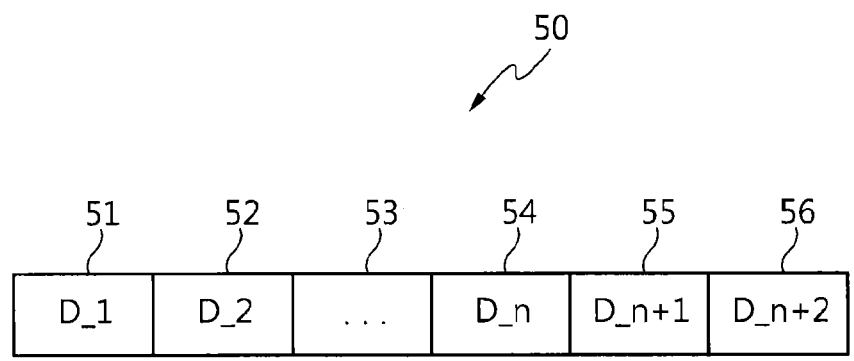
Figure 3:
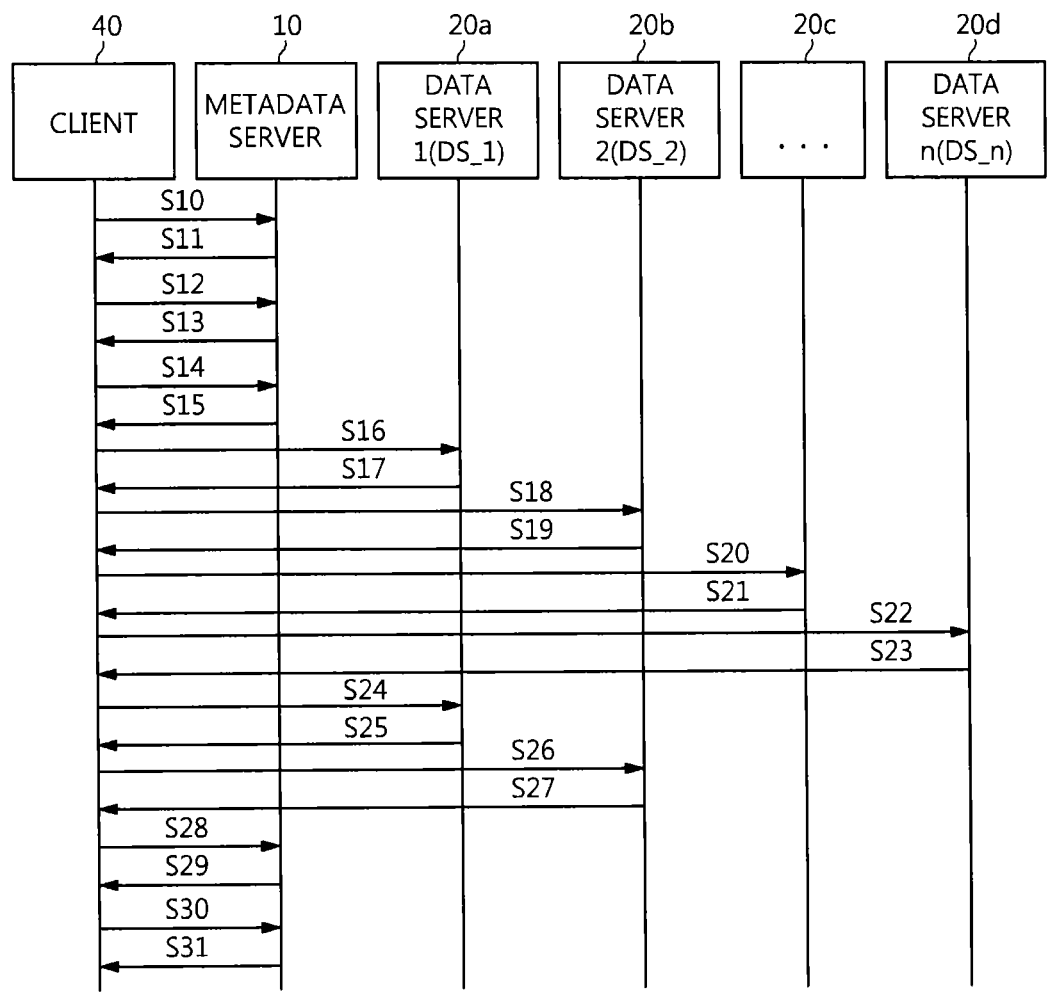
Figure 4:
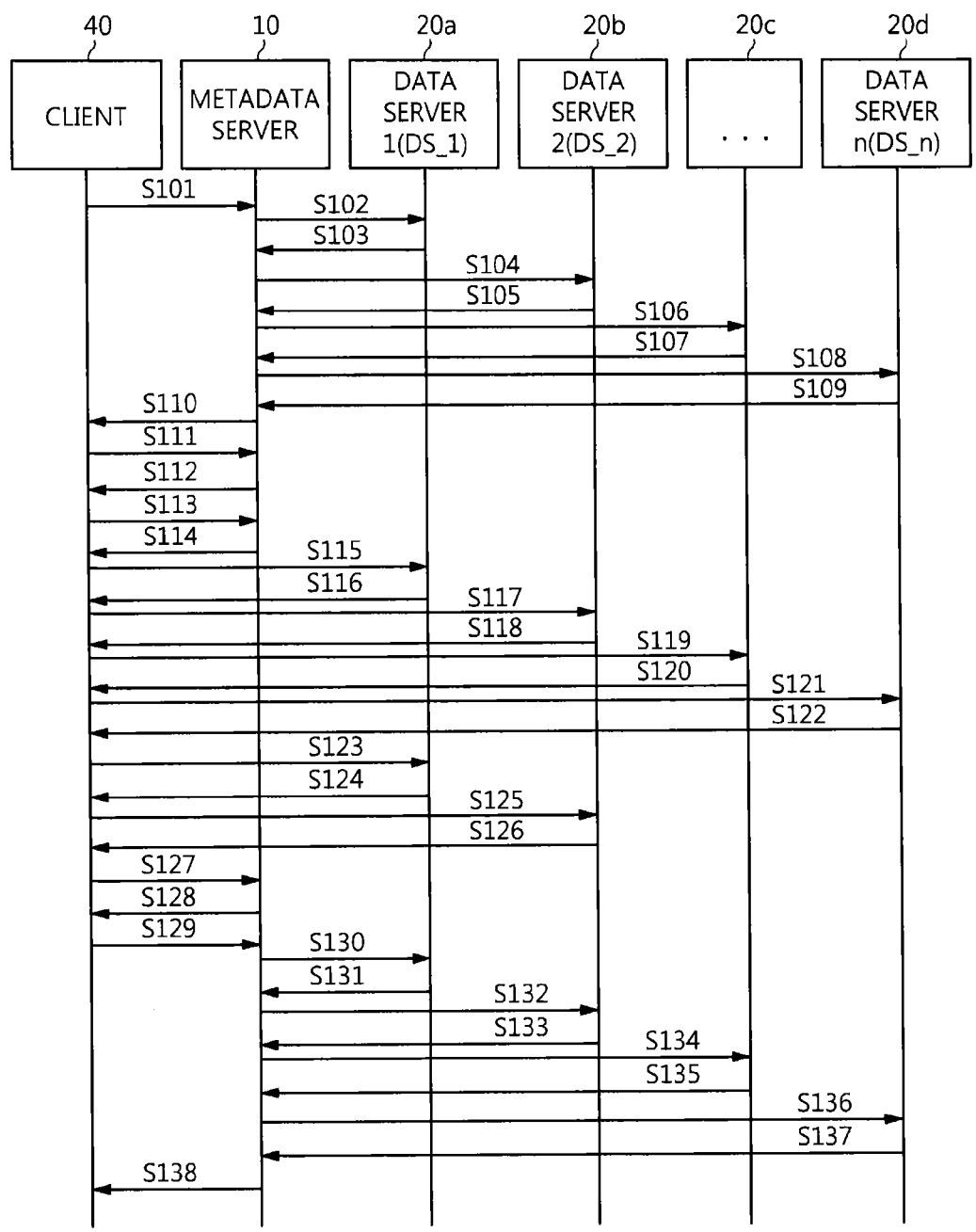
FIG. 4 is a diagram illustrating a method of performing a file operation in the asymmetric cluster file system according to an embodiment of the present invention.

FIG. 4 is a diagram illustrating a method of performing a file operation in the asymmetric cluster file system according to an embodiment of the present invention. That is, FIG. 4 is a signal flow diagram showing requests and responses that are exchanged between a client and a metadata server and between the metadata server and data servers when the client generates, uses and closes a file in the file system.

First, a client 40 sends a request for the generation of file A (that is, OPEN(A)) to a metadata server 10 at step S101.

The metadata server 10 that has received the OPEN request for the generation of file A 50 from the client 40 generates the file handle value a_0 corresponding to the file name A received from the client 40. The metadata server 10 sets the generated file handle value a_0 as a file name. The metadata server 10 sends MDS2DS_OPEN requests, including file name a_0, to data servers 20a, 20b, 20c and 20d at steps S102, S104, S106 and S108.

The data servers 20a, 20b, 20c and 20d that have received the MDS2DS_OPEN requests generate files using the received file name. The data servers 20a, 20b, 20c and 20d send responses, including the file handle values a_1, a_2, . . . , and a_n of the corresponding files, to the metadata server 10 at steps S103, S105, S107 and S109. Here, the metadata server 10 manages the file handle values a_1, a_2, ..., and a_n of the data servers 20a, 20b, 20c and 20d received from the data servers 20a, 20b, 20c and 20d using a file handle value list so that they are associated with the file handle value a_0 of the metadata server 10.

Once the metadata server 10 has received the responses from the data servers 20a, 20b, 20c and 20d, it sends a file handle response (that is, filehandle=a_0) to the client 40 at step S110.

If the client 40 has received the file handle response, it sends a LAYOUT_GET request (that is, LAYOUT_GET(a_0)) to the metadata server 10 at step S111. The metadata server 10 sends the file handle value list received from the data servers 20a, 20b, 20c and 20d to the client 40 in response to the LAYOUT_GET request from the client 40 at step S112. That is, the metadata server 10 sends the file handle value list, associated with the file handle value a_0 included in the LAYOUT_GET request from the client 40, (that is, dev_id=1, filehandle list={a_1, a_2, ..., a_n}) to the client 40.

The client 40 sends a device information request (that is, DEVICE_INFO=1) to the metadata server 10 at step S113. Accordingly, the metadata server 10 sends a response, including device information, (that is, dev_id=1, multipath list= [{DS_1}, {DS_1}, ..., {DS_n}], stripendices={0, 1, ..., n−1}, first_strip_index=0) to the client 40 at step S114.

The client 40 derives the addresses of the data servers 20a, 20b, 20c and 20d and the file handle values of the data servers 20a, 20b, 20c and 20d from the integration of the response, including file layout information and received from the metadata server 10, (that is, the response at step S112) and the response, including device information (that is, the response at step S114).

The client 40 sends a write or read request, including a corresponding file handle value, the offset and size of a corresponding logical chunk and actual data content, to each of the data servers 20a, 20b, 20c and 20d in order to write or read actual data using the derived file handle values at steps S115, S117, S119, S121, S123 and S125. In this case, values corresponding to the indices of the stripe sequence (stripeindices={0, 1, ..., n−1}) of the list of the data servers in which the logical chunks have been stored, in the file handle value list (filehandle list={a_1, a_2, ..., a_n}) included in the file layout information, are used as the file handle values to be sent to the data servers 20a, 20b, 20c and 20d, and the index value of the data server in which the first logical chunk has been stored (first_stripe_index=0) starts to be referred to. Furthermore, the data servers 20a, 20b, 20c and 20d execute corresponding operations and then send responses, including the results of the operations, to the client 10 at steps S116, S118, S120, S122, S124 and S126.

Once the client 40 has completed a read operation, it sends a LAYOUT_COMMIT request, including information about the completion of the read operation and the file handle value a_0 of a corresponding file, (that is, LAYOUT_COMMIT (a_0)) to the metadata server 10 at step S127. The metadata server 10 updates the metadata information of the corresponding file while referring to the information about the completion received from the client 40, and then sends a response, including the results of the update, to the client 40 at step S128.

If the client 40 has received the response signal, including the results of the update of the metadata information of the file, from the metadata server 10, it sends a CLOSE request for the file handle value a_0 (that is, CLOSE(a_0)) to the metadata server 10 at step S129. Accordingly, the metadata server 10 sends MDS2DS_CLOSE requests, including the file handle values a_1, a_2, ..., and a_n managed by the corresponding data servers 20, to the data servers 20a, 20b, 20c and 20d associated with the corresponding file handle value a_0 at steps S130, S132, S134 and S136. In this case, the metadata server 10 sends MDS2DS_CLOSE a_1, MDS2DS_CLOSE a_2, ..., and MDS2DS_CLOSE a_n requests to the respective data servers 20a, 20b, 20c and 20d.

The data servers 20a, 20b, 20c and 20d that have received the MDS2DS_CLOSE requests from the metadata server 10 perform the task of returning system resources assigned to files having the file handle values a_1, a_2, ..., and a_n and send responses, including the results of the task, to the metadata server 10 at steps S131, S133, S135 and S137.

The metadata server 10 that has received the responses from the data servers 20a, 20b, 20c and 20d sends a response to the CLOSE request to the client 40 at step S138.

Figure 5:
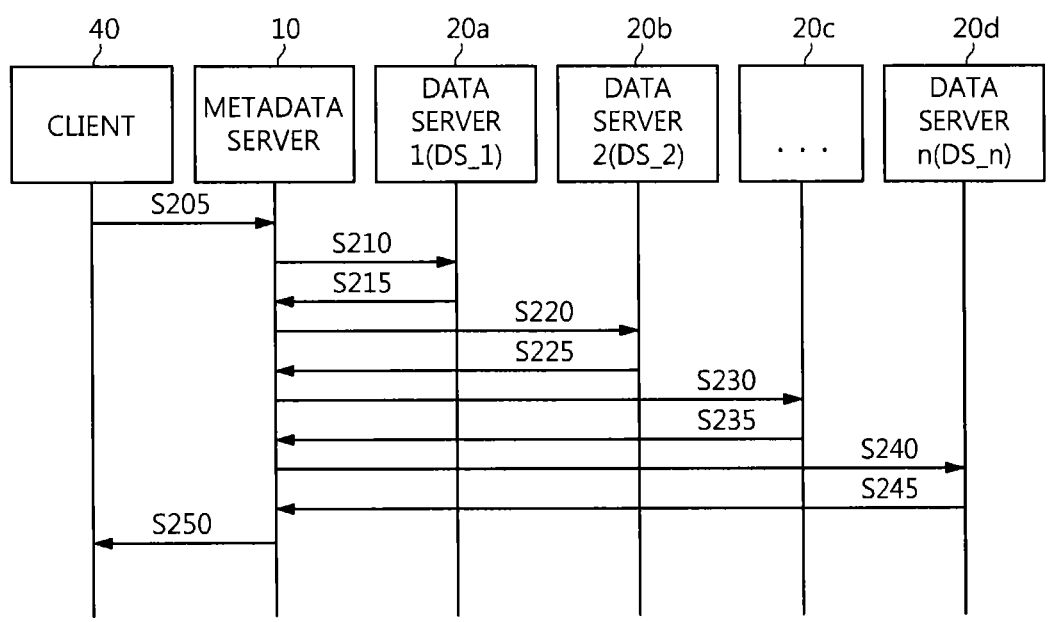
FIG. 5 is a diagram illustrating a method of deleting a file in the asymmetric cluster file system according to an embodiment of the present invention.

FIG. 5 is a flowchart illustrating a method of deleting a file in the asymmetric cluster file system according to an embodiment of the present invention.

The client 40 sends a REMOVE request, including file name A, to the metadata server 10 in order to delete file A 50 at step S205. That is, the client 40 sends a REMOVE(A) request signal to the metadata server 10 in order to request the deletion of file A 50.

The metadata server 10 detects a file name (that is, A) corresponding to the REMOVE request from the client 40. The metadata server 10 detects file name a_0 in the data servers 20a, 20b, 20c and 20d, corresponding to the detected file name A. The metadata server 10 sends MDS2DS_REMOVE requests, including the detected file name a_0, (that is, MDS2DS_REMOVE a_0) to the data servers 20a, 20b, 20c and 20d at steps S210, S220, S230 and S240.

The data servers 20a, 20b, 20c and 20d that have received the MDS2DS_REMOVE requests then delete files having the received file names. The data servers 20a, 20b, 20c and 20d send responses, including the results of the deletion of the files, to the metadata server 10 at steps S215, S225, S235 and S245.

The metadata server 10 integrates the responses received from the data servers 20a, 20b, 20c and 20d and sends a response, including the results of the integration, to the client 40 at step S250.

Figure 6:
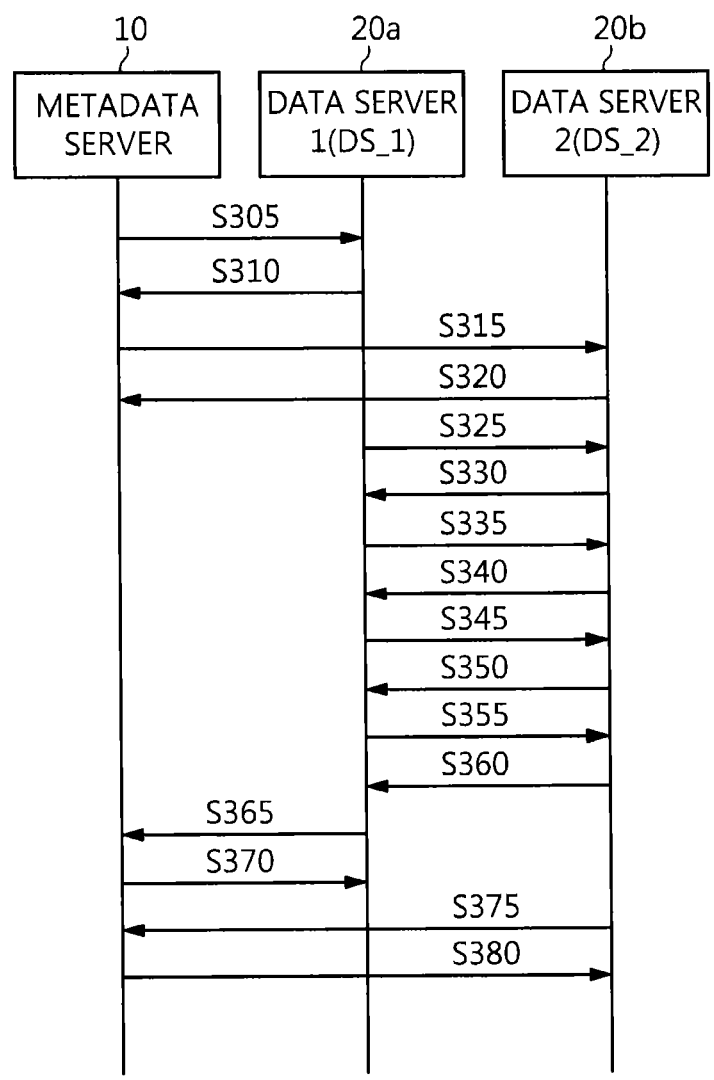
FIG. 6 is a drawing illustrating a method of copying a file in the asymmetric cluster file system according to an embodiment of the present invention.

FIG. 6 is a drawing illustrating a method of copying a file in the asymmetric cluster file system according to an embodiment of the present invention. That is, FIG. 6 is a signal flow diagram showing requests and responses that are exchanged to copy data chunks stored in a data server to another data server when the metadata server desires to copy the data chunks of a file. The following description will be given using a method by which a metadata server copies the data chunks of a file from data server 1 to data server 2 as an example.

First, the metadata server 10 detects a source data server in which source data chunks to be copied have been stored and a target data server in which copied data chunks will be stored. In the following description, it is assumed that the metadata server 10 detects data server 1 20a as the source data server and data server 2 20b as the target data server, and the source data server is described as the source data server 20a and the target data server is described as the target data server 20b.

The metadata server 10 sends an MDS2DS_COPY request, including information about the source data server 20a, information about the target data server 20b, the name of a file to be copied, and a list of the indices of data chunks to be copied, to the source data server 20a at step S305. That is, the metadata server 10 sends the request in the form of MDS2DS_COPY_DS__1, DS2, a__0, chunk index list={0, n} to the source data server 20*a*.

The source data server 20*a* performs the task of preparing for copying and sends a response, including the file handle value a__1 of the corresponding file in the data server, (that is, filehandle=a__1) to the metadata server 10 at step S310.

Additionally, the metadata server 10 sends an MDS2DS_COPY request, including the information about the source data server 20*a*, the information about the target data server 20*b*, the name of the file to be copied and the list of the indices of the data chunks to be copied, to the target data server 20*b* at step S315. At this time, the metadata server 10 sends a request, identical to the above-described request sent to the source data server 20*a* at step S305, to the target data server 20*b*.

The target data server 20*b* performs the task of preparing for copying and sends a response, including the file handle value a__2 of the corresponding file in the data server, (that is, filehandle=a__2) to the metadata server 10 at step S320.

The source data server 20*a* sends a DS2DS_OPEN request, including the name of the file to be copied (name a__0), (that is, DS2DS_OPEN_a__0) to the target data server 20*b* in order to notify the target data server 20*b* of the start of the copying at step S325.

The target data server 20*b* opens a file having the received file name and then sends a response, including a corresponding file handle value copy_a__2, (that is, filehandle=copy_a__2) to the source data server 20*a* at step S330.

The source data server 20*a* sends a DS2DS_WRITE request, including the file handle value copy_a__2 received from the target data server 20*b* and the content D__1 and D_n of the data chunks corresponding to the list of the indices of the data chunks to be copied, to the target data server 20*b* at steps S335 and S345. In this case, the source data server 20*a* may send a DS2DS_READ request to read data chunks stored in the target data server 20*b* and store them in the source data server 20*a* to the target data server 20*b* in a manner similar to that of the DS2DS_WRITE request. That is, the source data server 20*a* sends a DS2DS_WRITE request in the form of DS2DS_WRITE copy_a__2, D__1 or a DS2DS_READ request in the form of DS2DS_READ copy_a__2, D__1 to the target data server 20*b*.

The target data server 20*b* stores the received content D__1, D_n of the data chunks in a file a__0 having the received file handle value copy_a__2 and sends a response, including the results of the storage, to the source data server 20*a* at steps S340 and S350.

Once the source data server 20*a* has sent the content of the data chunks to be copied, it sends a DS2DS_CLOSE request, including the file handle value copy_a__2 received from the target data server 20*b*, (that is, DS2DS_CLOSE copy_a__2) to the target data server 20*b* at step S355.

The target data server 20*b* performs the task of returning system resources assigned to the file corresponding to the received file handle value copy_a__2 and sends a response, including the results of the performance, to the source data server 20*a* at step S360.

Once the task of copying the data chunks has been completed, the source data server 20*a* sends a DS2MDS_COPY_DONE signal, including the file handle value a__1 included in the response to the received MDS2DS_COPY request, (that is, DS2MDS_COPY_DONE a__1) to the metadata server 10 at step S365.

The metadata server 10 performs the task of returning system resources assigned for the copying and sends a response, including the results of the performance, to the source data server 20*a* at step S370.

The target data server 20*b* sends a DS2MDS_COPY_DONE, including the file handle value a__2 included in the response to the MDS2DS_COPY request, (that is, DS2MDS_COPY_DONE a__2) to the metadata server 10 at step S375.

The metadata server 10 performs the task of returning system resources assigned for the copying and sends a response, including the results of the performance, to the target data server 20*b* at step S380.

Figure 7:
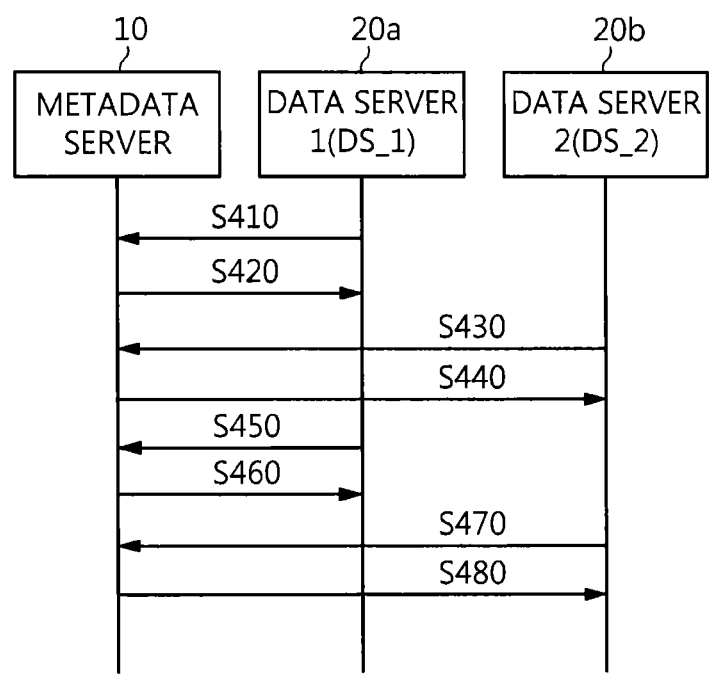
FIG. 7 is a drawing illustrating a method of adding data servers to the asymmetric cluster file system according to an embodiment of the present invention.

FIG. 7 is a drawing illustrating a method of adding data servers to the asymmetric cluster file system according to an embodiment of the present invention. That is, FIG. 7 is a signal flow diagram showing requests and responses that are exchanged to register data servers with the metadata server and report the status of the data servers to the metadata server. The following description will be given on the assumption that data server 1 and data server 2 are added to the asymmetric cluster file system and then operated.

First, data server 1 20*a* to be added sends a DS2MDS_REGISTER request for addition to the asymmetric cluster file system to the metadata server 10 at step S410. At this time, data server 1 20*a* sends a DS2MDS_REGISTER request, including a data server ID value and its available capacity (that is, DS2MDS_REGISTER(DS__1)).

The metadata server 10 adds data server 1 20*a* to the configuration of the asymmetric cluster file system by storing information, including the data server ID value and the available capacity received from data server 1 20*a*. The metadata server 10 sends a response, including the results of the addition, to data server 1 20*a* at step S420.

Data server 2 20*b* to be added sends a DS2MDS_REGISTER request to be added to the asymmetric cluster file system to the metadata server 10 at step S430. At this time, data server 2 20*b* sends a DS2MDS_REGISTER request, including a data server ID value and its available capacity (that is, DS2MDS_REGISTER(DS__2)).

The metadata server 10 adds data server 2 20*b* to the configuration of the asymmetric cluster file system by storing information, including the data server ID value and the available capacity received from data server 2 20*b*. The metadata server 10 sends a response, including the results of the addition, to data server 2 20*b* at step S440.

Data server 1 20*a* added to the asymmetric cluster file system sends a DS2MDS_REPORT request, including the current status value of the data server, (that is, DS2MDSREPORT(DS__1_status)) to the metadata server 10 at step S450.

In this case, data server 1 20*a* sends the status value at predetermined periodic intervals, or aperiodically sends the status value (that is, when a specific event occurs).

The metadata server 10 records the received status value of data server 1 20*a* and sends a response, including the results of the recording, to data server 1 20*a* at step S460.

Data server 2 20*b* that is added to the asymmetric cluster file system sends a DS2MDS_REPORT request, including the current status value of the data server 20, (that is, DS2MDS_REPORT(DS__2_status)) to the metadata server 10 at step S470. At this time, data server 1 20*a* sends the status value at predetermined periodic intervals, or aperiodically sends the status value (that is, when a specific event occurs).

The metadata server 10 records the status value received from data server 1 20*a* and sends a response, including the results of the recording, to data server 1 20*a* at step S480. The metadata server 10 may perform the assignment of a device or the replacement of a data server or make a report to an administrator while referring to the status value of the data server 20.

A method of managing data when the asymmetric cluster file system fails according to an embodiment of the present invention will be described in detail below with reference to the accompanying drawings. In the following description, a method of configuring file access information (device and file layouts) in order to prepare for the failure of a data server in advance, a method of copying data and then reconfiguring a file layout, a method of reconfiguring file access information when the failure of a data server is detected, a method of restoring data and then reconfiguring a file layout in order to meet a desired copying level, and a method of reconfiguring file access information in order to restore data parallelism when a data server is added will be described in detail below.

First, the metadata server 10 causes the file handle value list included in the response to the LAYOUT_GET request transferred to the client 40 to be multiplicate, as in a data server multipath method. That is, the metadata server 10 causes the file handle value list (filehandle={a_1, a_2, ..., a_n}) to be multiplicate. In greater detail, the metadata server 10 also causes the file handle value list in the form of [{a_1, a_2}, {a_2, a_3}, ..., {a_n−1, a_n}] if a list of the addresses of the data servers 20a, 20b, 20c and 20d storing logic chunk-based data chunks, which belongs to device information included in a response to a DEVICE_INFO request, is multiplicate in the form of [{DS_1, DS_2}, {DS_2, DS_3}, ..., {DS_n−1, DS_n}].

Accordingly, the client 40 uses the file handle values managed by the data servers 20a, 20b, 20c and 20d when accessing the data servers 20a, 20b, 20c and 20d in which corresponding data chunks have been stored. That is, when the client 40 desires to access a first logical chunk, it detects multiplicate data servers {DS_1, DS_2} in which the first logical chunk has been stored in the list of the addresses of the data servers 20a, 20b, 20c and 20d in which the logical chunk-based data chunks have been stored, and detects multiplicate file handle values {a_1, a_2} in the file handle value list. The client 40 accesses a data server using the data server and a file handle value in the corresponding data server included in the detected information. In this case, if the file handle value is an invalid value, the client 40 accesses another data server using a corresponding file handle value in the data server.

When the client 40 desires to perform a write operation on file A, it accesses only a first data server in the multiplicate data server list and then performs the write operation. In this case, although the index of the address of a data server that will perform a write operation may be set freely in the multiplicate data server list because it is a tacit promise made between the client and the data server, this embodiment will be described with the address of the data server that will perform a write operation being set as a first index. When the client 40 desires to perform a read operation, it accesses the data server of the multiplicate data servers, which provides a valid file handle value, and performs the read operation. In order to guarantee this, the metadata server 10, when the failure of a specific data server is detected, searches the multiplicate data server list for the case in which the corresponding data server has been registered as a first data server, and makes a change so that a data server in which a copy has been stored becomes the first data server.

Figure 8:
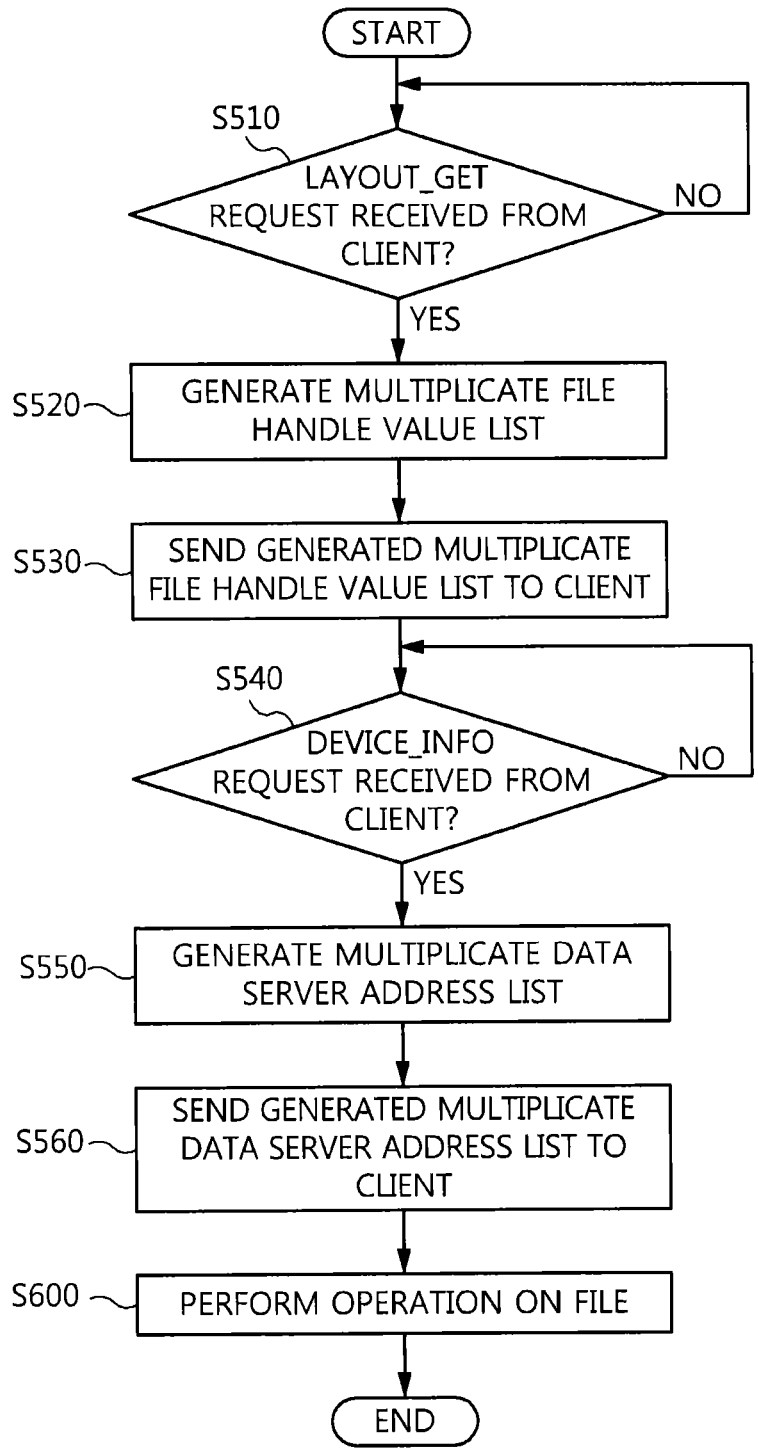
FIGS. 8 and 9 are flowcharts illustrating a method of using a multiplicate file handle value list and a multiplicate data server address list added to prepare for the failure of a data server of the asymmetric cluster file system, between the metadata server and the client.
Figure 9:
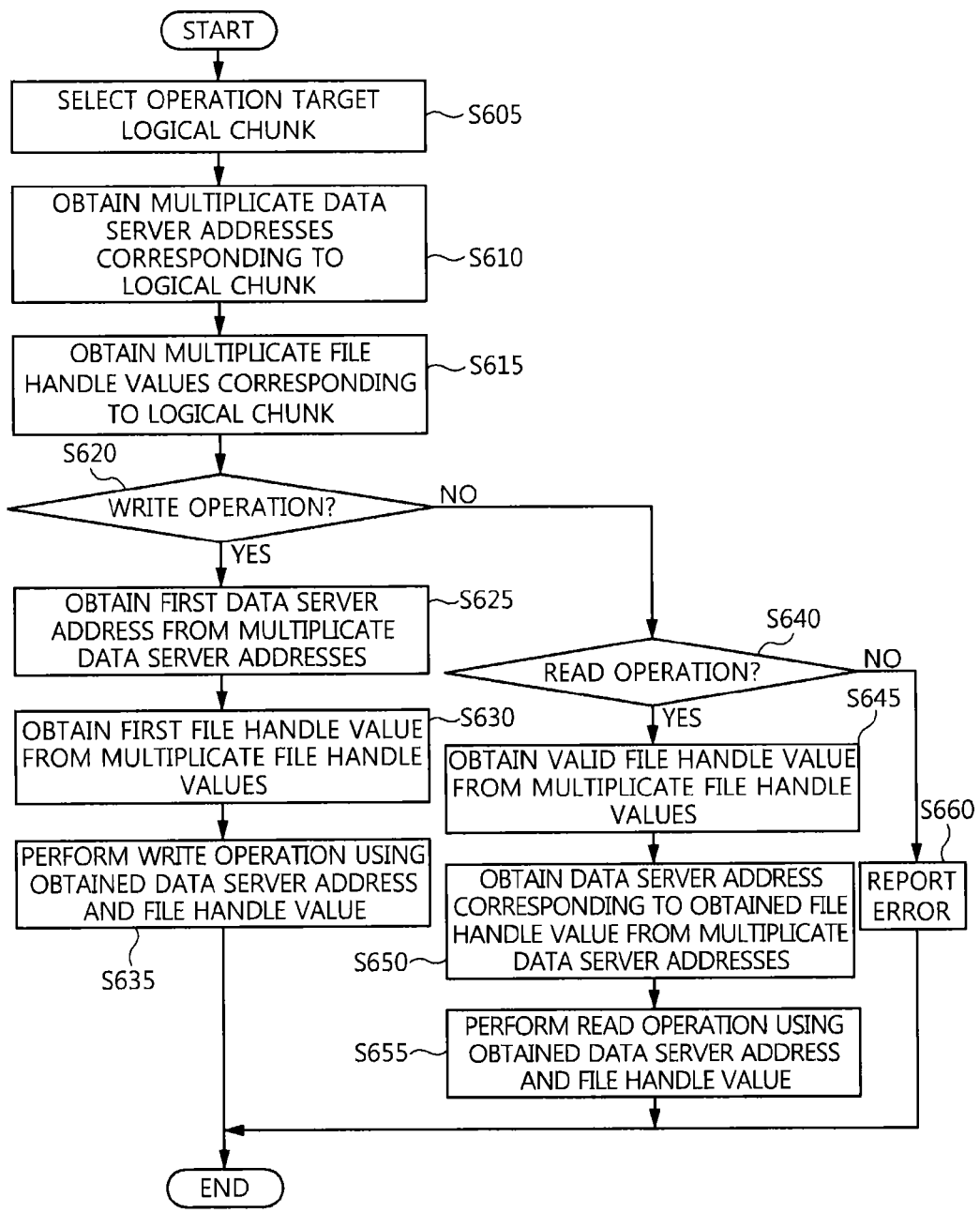

FIGS. 8 and 9 are flowcharts illustrating a method of using a multiplicate file handle value list and a multiplicate data server address list added to prepare for the failure of a data server of the asymmetric cluster file system, between the metadata server and the client.

If the metadata server 10 has received a LAYOUT_GET request used to check a specific file layout from the client 40 (YES) at step S510, it generates a multiplicate file handle value list related to a corresponding file at step S520.

The metadata server 10 sends the generated multiplicate file handle value list to the client 40 at step S530.

If the metadata server 10 has received a DEVICE_INFO request used to check specific device information from the client 40 (YES) at step S540, it generates a multiplicate data server address list related to a corresponding device at step S550.

The metadata server 10 sends the generated multiplicate data server address list to the client 40 at step S560.

The client 40 accesses the target file based on the received file handle value list and the data server address list and then performs a file operation at step S600. Here, the step at which the client 40 performs a file operation will be described in greater detail below with reference to FIG. 9.

First, the client 40 selects a logical chunk on which an operation will be performed at step S605.

The client 40 obtains multiplicate data server addresses corresponding to the selected logical chunk at step S610. Here, the client 40 obtains the multiplicate data server addresses from a data server index at which a first logical chunk has been stored (firststripe_index), a stripe sequence, and a list of the multiplicate data server addresses.

The client 40 obtains multiplicate file handle values corresponding to the selected logical chunk at step S615.

If a write operation will be performed (YES) at step S620, the client 40 obtains a first data server address from the obtained multiplicate data server addresses at step S625.

The client 40 obtains a first file handle value from the obtained multiplicate file handle values at step S630.

The client 40 performs the write operation on a file using the obtained data server address and file handle value at step S635.

If a read operation will be performed (YES) at step S640, the client 40 obtains a valid file handle value from the multiplicate file handle values at step S645.

The client 40 obtains a data server address corresponding to the obtained file handle value from the multiplicate data server addresses at step S650.

The client 40 performs the read operation on a file using the obtained data server address and file handle value at step S655.

Meanwhile, if a corresponding operation is neither a write operation nor a read operation, the client 40 reports an error at step S660.

Methods of generating a file and copying a generated file in the asymmetric cluster file system according to an embodiment of the present invention will be described in detail below with reference to the accompanying drawings.

First, the methods of generating a file and copying a generated file in the asymmetric cluster file system will be described in short below.

Once the generation of file A 50 has been completed by the client 40, the metadata server 10 copies the generated file A 50. In this case, the metadata server 10 repeats copying file A 50 until a desired copying level is met.

The data servers 20a, 20b, 20c and 20d included in a device in which the source of file A 50 has been stored copy source data chunks.

Furthermore, the metadata server 10 stores the source data chunks and its copied data chunks in different data servers in order to prepare for the failures of the data servers 20 and distribute the access load imposed by the client 40. That is, the metadata server 10 selects a data server index different from a data server index at which the first logical chunk of the source of file A 50 has been stored (first_stripe_index), as a data server index at which the first logical chunk of a copy of file A 50 will be stored. This enables the metadata server 10 to store the source data chunks and the copied data chunks in different data servers.

The metadata server 10 generates devices and assigns IDs for all or some of data servers DS_1~DS_n currently registered with the metadata server 10 in order to support copying levels 1 to N. Here, copying level 1 refers to the level at which a copy is not generated, and copying level N refers to the level at which the number of source and copied data chunks is N.

The following examples are cases where devices are generated and IDs are assigned for all of registered data servers in order to support copying levels 1 to N.

Copying level 1 supporting devices=[{DS_1}, {DS_2}, . . . , {DS_n}]

Copying level 2 supporting devices=[{DS_1, DS_2}, {DS_2, DS_3}, . . . , {DS_n, DS_1}]

Copying level 3 supporting devices=[{DS_1, DS_2, DS_3}, {DS_2, DS_3, DS_4}, . . . , {DS_n, DS_1, DS_2}]

Copying level N supporting devices=[{DS_1, DS_2, . . . , DS_n}, {DS_2, DS_3, . . . , DS_n, DS_1}, . . . , {DS_n, DS_1, . . . , DS_n−1}]

The metadata server 10 may assign different devices to a file and then perform management in accordance with a copying level that is required by the file.

In this specification, only a case in which all files require copying level 2 will be described. Methods regarding the other copying levels are performed in the same manner.

The metadata server 10 generates devices and assigns ID values for all of registered data servers DS_1~DS_3 in order to meet copying level 2. In this case, data servers immediately subsequent to the first multiplicate data servers DS_1, DS_2 and DS_3 are selected as the second multiplicate data servers.

Device 1=[{DS_1, DS_2}, {DS_2, DS_3}, {DS_3, DS_1}]

Sequence of stripes of logical chunk: stripeindicies={0, 1, 2}

Index of data server in which first logical data chunk has been stored: first_stripe_index=2

File A=[first logical chunk][second logical chunk][third logical chunk][fourth logical chunk]

Figure 10:
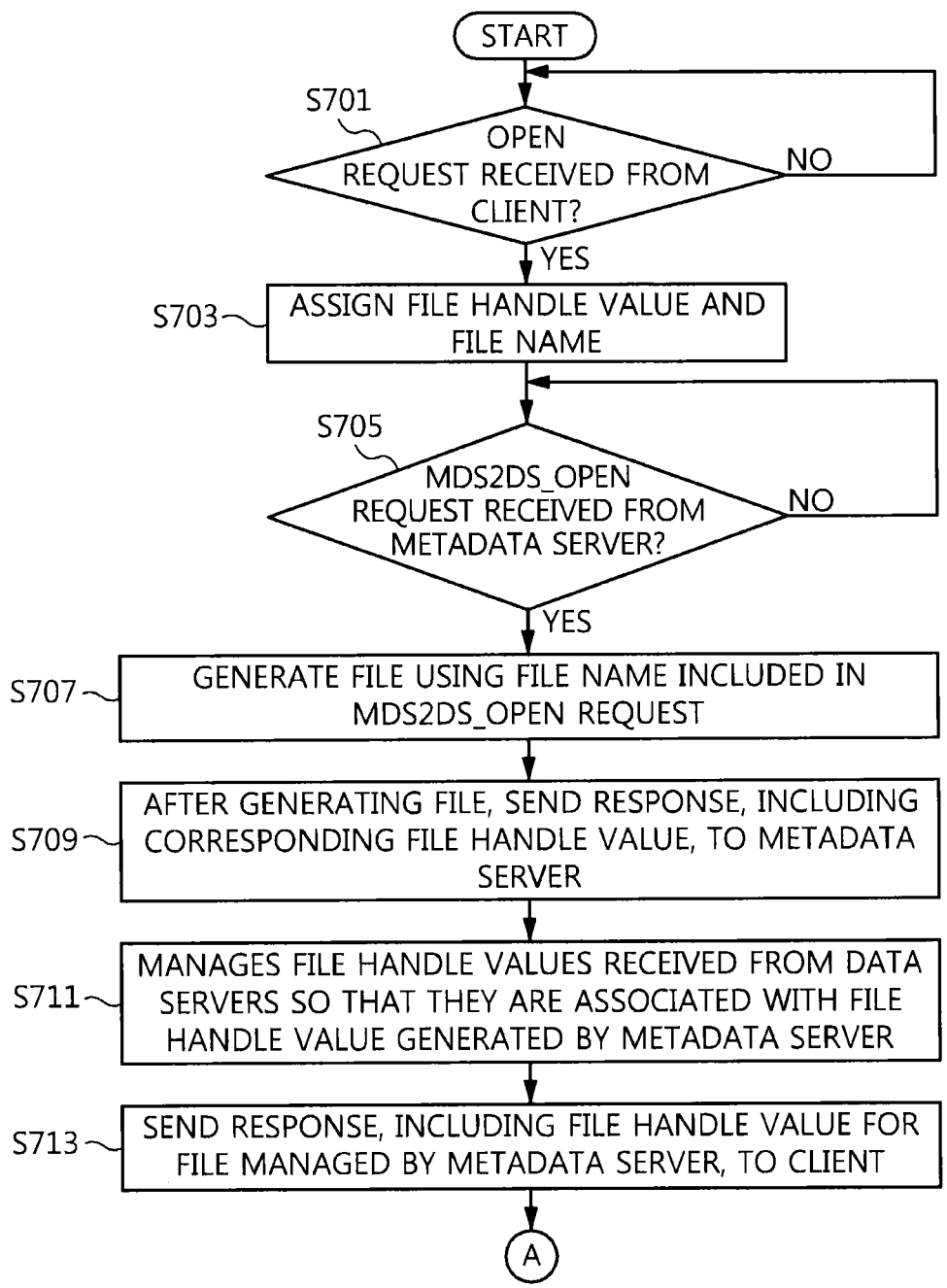
FIGS. 10 to 12 are flowcharts illustrating a method of generating a file in the asymmetric cluster file system.
Figure 11:
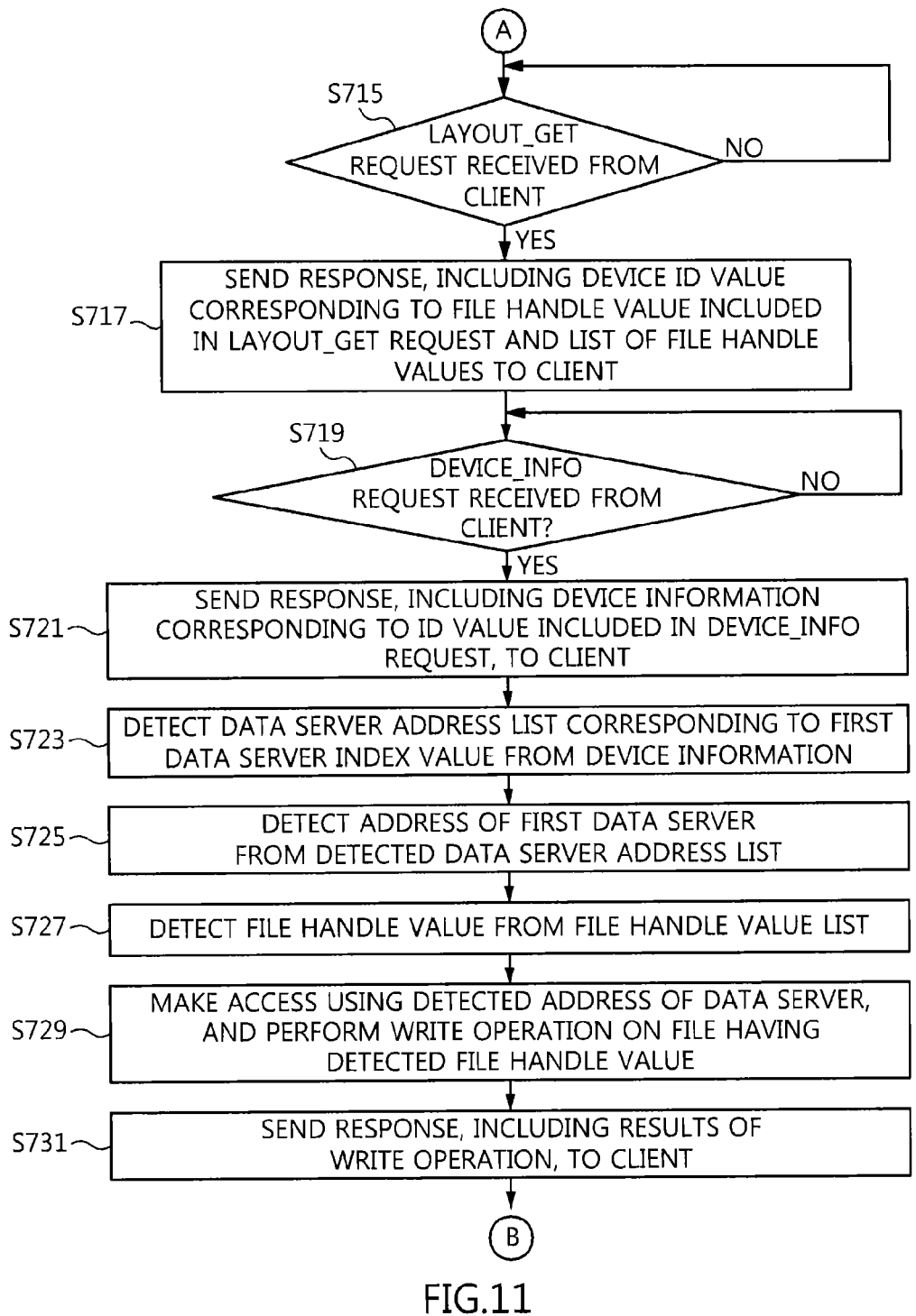
Figure 12:
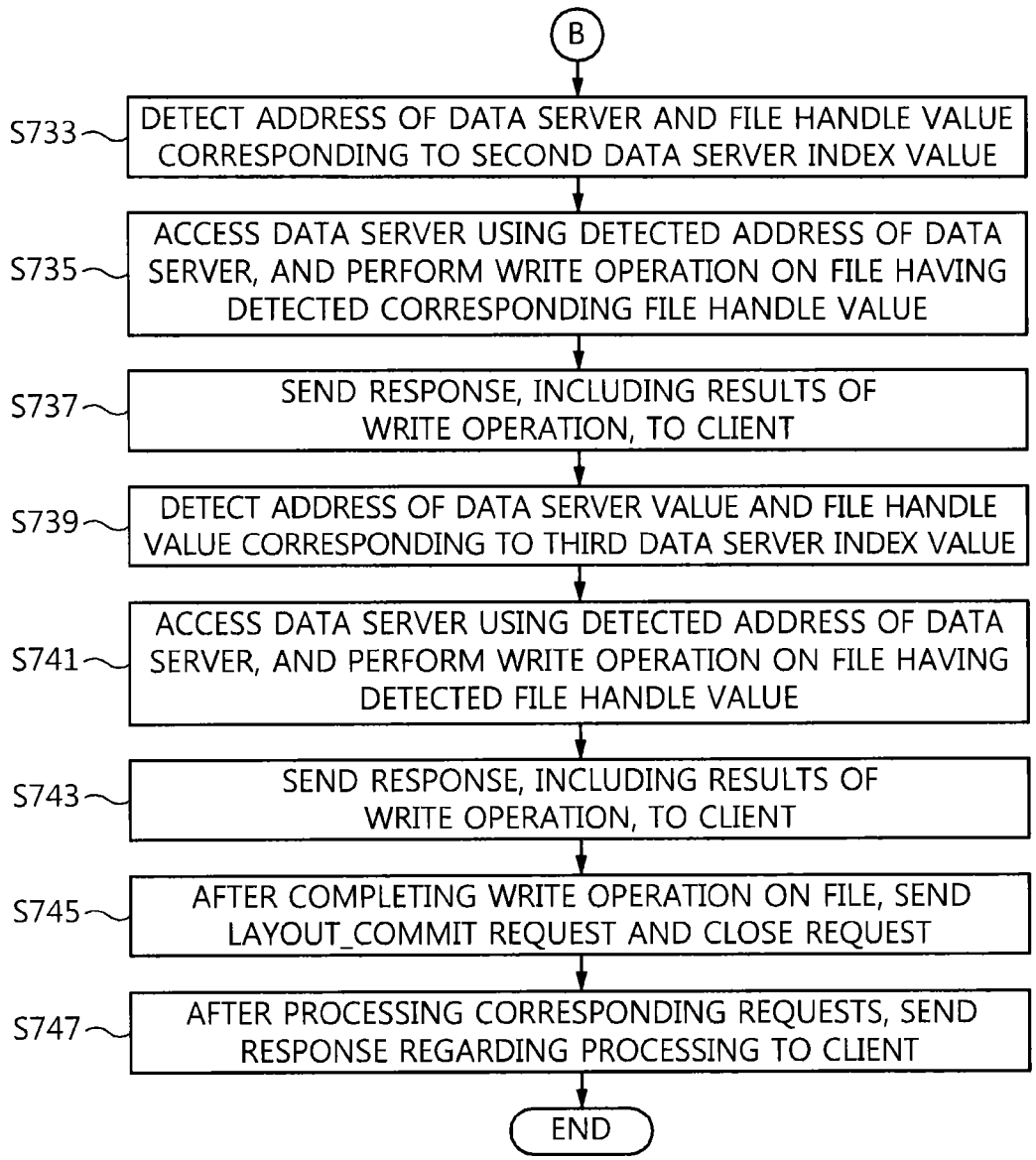

FIGS. 10 to 12 are flowcharts illustrating a method of generating a file in the asymmetric cluster file system. The following description will be given using a case in which file A 50 composed of four logical chunks is generated and recorded as an example. First, it is assumed that the asymmetric cluster file system includes three data servers DS_1, DS_2 and DS_3 and the metadata server 10.

The client 40 sends an OPEN request to the metadata server 10 in order to generate file A 50. If the metadata server 10 has received the OPEN request from the client 40 (YES) at step S701, it assigns a file handle value for the corresponding file and a file name to be used in the data servers 20 because there is no file A 50 at step S703.

The metadata server 10 sends an MDS2DS_OPEN request, including the file name, to the first data servers DS_1, DS_2 and DS_3 of the multiplicate data server list of data server lists included in device 1. If each of the data servers DS_1, DS_2 and DS_3 has received the MDS2DS_OPEN request from the metadata server 10 (YES) at step S705, it generates a file using the file name received from the metadata server 10 at step S707.

After generating the file, each of the data servers DS_1, DS_2 and DS_3 sends a response, including a corresponding file handle value, to the metadata server 10 at step S709.

The metadata server 10 manages the file handle values received from the data servers DS_1, DS_2 and DS_3 so that they are associated with the file handle value generated for file A 50 at step S711. That is, the metadata server 10 manages a valid file handle value list in the data servers DS_1, DS_2 and DS_3 for file A 50 in the form of [{a_1, INVALID}, {a_2, INVALID}, {a_3, INVALID}]. Furthermore, the metadata server 10 sets a data server index at which the first logical chunk will be stored (firststripe_index) to 2. Here, the first data server index may be set using a variety of methods in order to desirably distribute the access load imposed by the client 40, and is generally set to any one of available index values.

The metadata server 10 sends a response, including the file handle value for file A 50 managed by itself, to the client 40 at step S713.

The client 40 requires file layout information in order to perform a write or read operation on file A 50. Accordingly, the client 40 sends a LAYOUT_GET request, including the file handle value, to the metadata server 10 in order to obtain the layout information for file A 50. If the metadata server 10 has received the LAYOUT_GET request from the client 40 (YES) at step S715, the metadata server 10 sends a response, including the device ID value 1 corresponding to the file handle value included in the LAYOUT_GET request and a list of file handle values valid in the data servers DS_1, DS_2 and DS_3 associated with the device ID value 1 (that is, [{a_1, INVALID}, {a_2, INVALID}, {a_3, INVALID}]), to the client 40 at step S717.

The client 40 sends a DEVICE_INFO request, including the corresponding ID value 1, to the metadata server 10 in order to obtain detailed information about the device ID value 1. If the metadata server 10 has received the DEVICE_INFO request from the client 40 (YES) at step S719, it sends a response, including device information corresponding to the ID value 1 included in the device DEVICE_INFO request (that is, [{DS_1, DS_2}, {DS_2, DS_3}, {DS_3, DS_1}]), to the client 40 at step S721.

The client 40 detects the data server address list {DS_3, DS_1} corresponding to the first data server index value 2 from the device information in order to write data corresponding to the first logical chunk of file A 50 at step S723.

Since the client 40 performs a write operation, it detects the address of the first data server (that is, DS_3) from the detected data server address list at step S725.

The client 40 detects a corresponding file handle value a_3 from a corresponding file handle value list {a_3, INVALID} at step S727.

The client 40 accesses the data server DS_3 using the detected address of the data server. The client 40 performs a write operation on a file having the detected corresponding file handle value, which is selected from among files stored in the accessed data server DS_3 at step S729. For this purpose, the client 40 sends a write request, including the corresponding file handle value and data content to be written, to the corresponding data server.

The data server DS_3 writes the received data content in a file corresponding to the file handle value a_3 received from the client 40 and sends a response, including the results of the write operation, to the client 40 at step S731.

Thereafter, the client 40 detects the address of the data server DS_1 and file handle value a_1 corresponding to the second data server index value 0 in order to write data corresponding to the second logical chunk of file A 50 at step S733.

The client 40 accesses the data server DS_1 using the detected address of the data server. The client 40 performs a write operation on a file having the detected corresponding file handle value, which is selected from among files stored in the accessed data server DS_1 at step S735. For this purpose, the client 40 sends a write request, including the corresponding file handle value and data content to be written, to the corresponding data server.

The data server DS_1 writes the received data content in the offset of a corresponding logical chunk in a file corresponding to the file handle value a_1 received from the client 40 and sends a response, including the results of the write operation, to the client 40 at step S737.

The client 40 detects the address of the data server value DS_2 and file handle value a_2 corresponding to the third data server index value 1 in order to write data corresponding to the third logical chunk of file A 50 at step S739.

The client 40 accesses the data server DS_2 using the detected address of the data server. The client 40 performs a write operation on a file having the detected corresponding file handle value, which is selected from among files stored in the accessed data server DS_2 at step S741. For this purpose, the client 40 sends a write request, including the corresponding file handle value and data content to be written, to the corresponding data server.

The data server DS_2 writes the received data content in the offset of a corresponding logical chunk in a file corresponding to the file handle value a_2 received from the client 40 and sends a response, including the results of the write operation, to the client 40 at step S743.

Once the write operation on file A 50 has been completed, the client 40 sends a LAYOUT_COMMIT request and a CLOSE request to the metadata server 10 at step S745.

The metadata server 10 processes the corresponding requests and sends a response regarding the processing to the client 40 at step S747.

Figure 13:
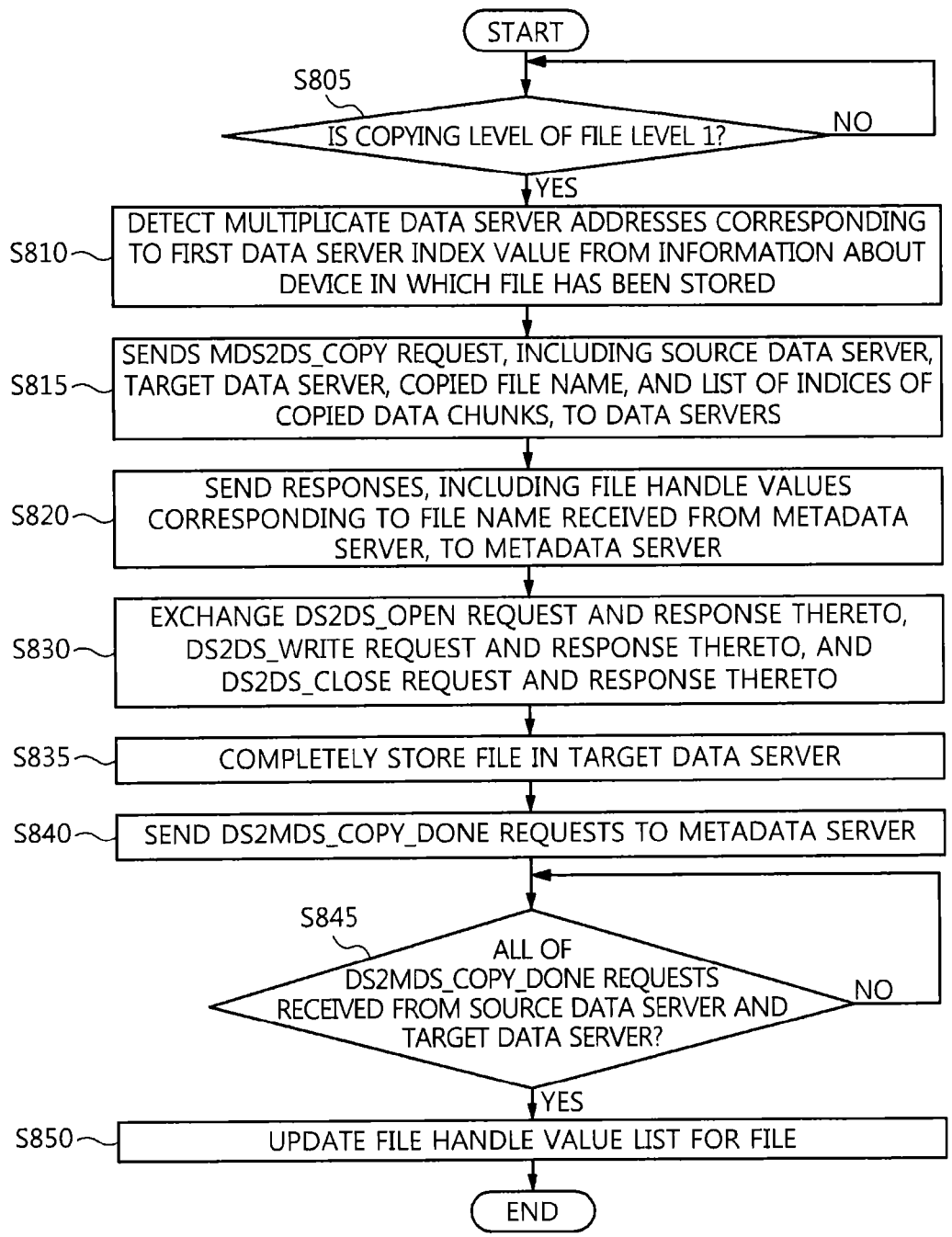
FIG. 13 is a flowchart illustrating a method of copying a generated file in the asymmetric cluster file system.

FIG. 13 is a flowchart illustrating a method of copying a generated file in the asymmetric cluster file system. The following description will be given using a method of copying generated file A in order to meet copying level 2 as an example.

If the copying level of the generated file A 50 is level 1 at step S805, the metadata server 10 starts the task of copying file A 50 in order to meet the copying level 2 of file A 50. For this purpose, the metadata server 10 detects the multiplicate data server addresses {DS_3, DS_1} corresponding to the first data server index value 2 from information about a device in which file A 50 has been stored (that is, [{DS_1, DS_2}, {DS_2, DS_3}, {DS_3, DS_1}]) at step S810.

Since data chunks have been stored in the first data server DS_3 of the corresponding data server address list {DS_3, DS_1}, the metadata server 10 sends an MDS2DS_COPY request, including a source data server, a target data server, a copied file name, and a list of the indices of copied data chunks, to the data servers at step S815. In this case, the metadata server 10 determines the data server DS_3 to be the source data server and the data server DS_1 to be the target data server, and sends an MDS2DS_COPY request, including information about the source data server (DS_3), information about the target data server (DS_1), the name of a file to be copied (a_0) and a list of the indices of data chunks to be copied (0, 3), to the data servers. Here, the list of the indices of data chunks stored in the source data server (that is, (0, 3)) may be easily found using the size of file A 50 (four chunks), the size of the stripe sequence {0, 1, 2} of logical chunks (3), and the first data server index 2.

The source data server DS_3 and the target data server DS_1 send responses, including file handle values corresponding to the file name a_0 received from the metadata server 10, to the metadata server 10 at step S820.

Thereafter, the source data server DS_3 and the target data server DS_1 exchange a DS2DS_OPEN request and a response thereto, a DS2DS_WRITE request and a response thereto, and a DS2DS_CLOSE request and a response thereto as described above at step S830.

Then the data chunks for the first and fourth logical chunks of the file a_0 in which the data of file A 50 stored in the source data server DS_3 has been stored have been completely stored in the target data server DS_1 at step S835.

The source data server DS_3 and the target data server DS_1 send DS2MDS_COPY_DONE requests to the metadata server 10 in order to notify the metadata server 10 of the success or failure of the copying at step S840.

If the metadata server 10 has received all of the DS2MDS_COPY_DONE requests from the source data server DS_3 and the target data server DS_1 (YES) at step S845, the metadata server 10 updates the file handle value list for file A 50 at step S850. That is, the file handle value list for file A 50 becomes [{a_1, INVALID}, {a_2, INVALID}, {a_3, a_1}].

Thereafter, the task of copying is performed on the remaining data server lists {DS_1, DS_2} and {DS_2, DS_3} of the device information in the same manner. That is, the file handle value list for file A 50 becomes [{a_1, a_2}, {a_2, a_3}, {a_3, a_1}].

Furthermore, not only the above-described method of copying all data chunks stored in the first data server with respect to each multiplicate data server included in the device information but also a method of sequentially copying logical chunks from a first logical chunk to a last logical chunk on a data chunk basis may be used.

Furthermore, when the client 40 requests file layout information in order to read file A 50 while the metadata server 10 is copying file A 50, the file handle value list updated up to that time may be transferred.

Figure 14:
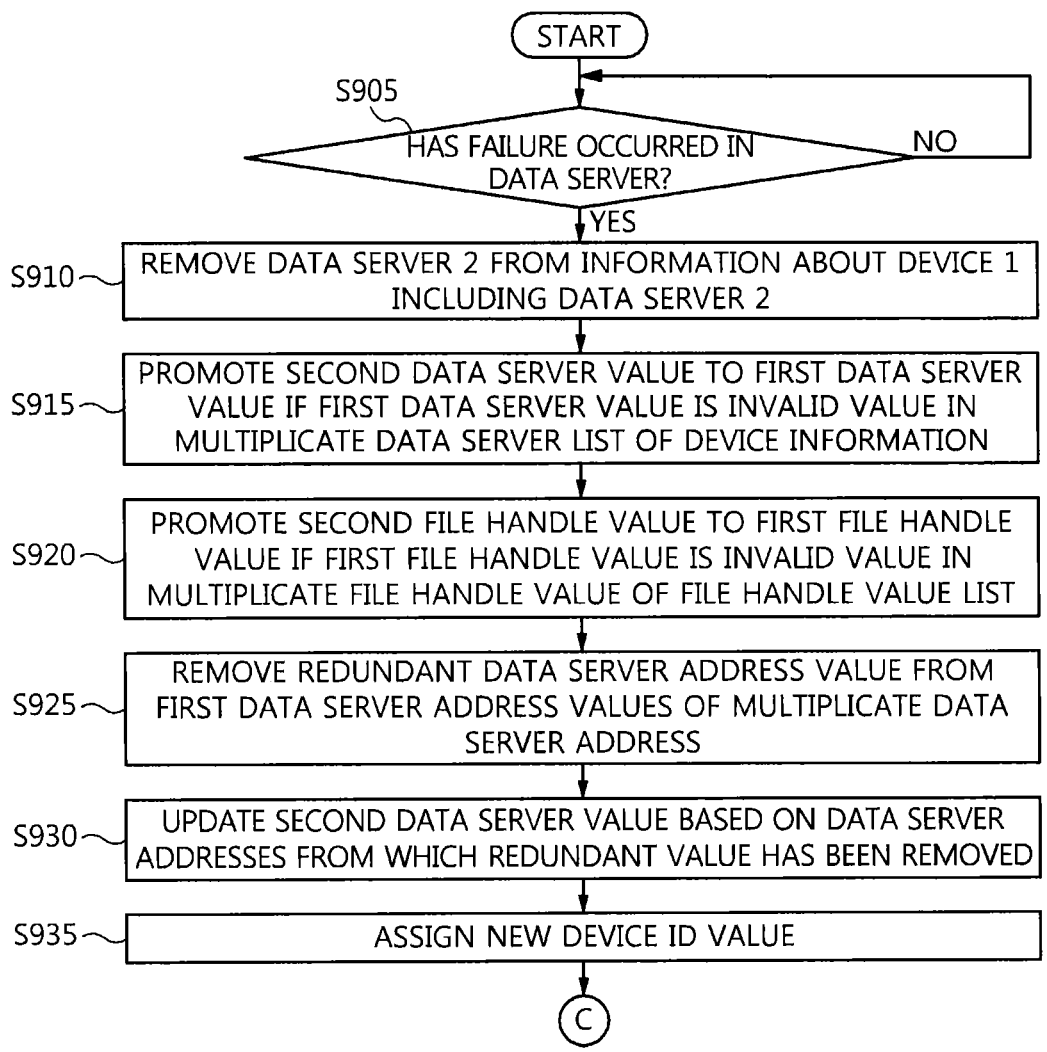
FIGS. 14 and 15 are flowcharts illustrating the operating procedure of the metadata server that is performed when the metadata server detects the failure of a data server included in a specific device.
Figure 15:
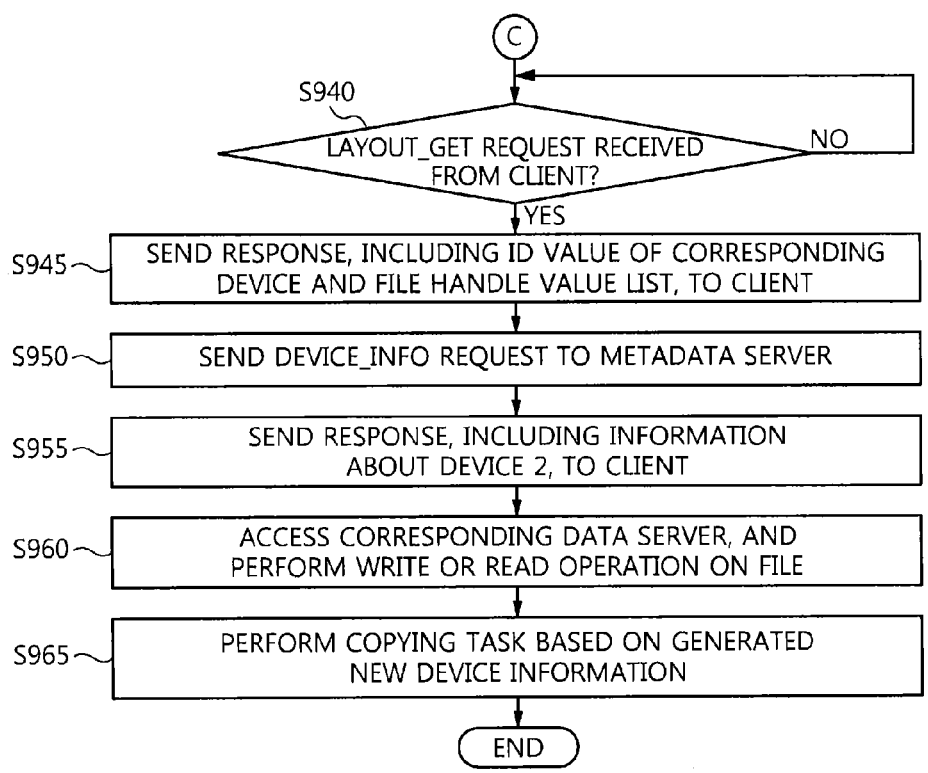

The process of the operation of the metadata server that is performed when the metadata server detects the occurrence of a failure in a data server included in a specific device will now be described. FIGS. 14 and 15 are flowcharts illustrating the operating procedure of the metadata server that is performed when the metadata server detects the failure of a data server included in a specific device. For reference, the failure of a data server may be detected by the metadata server using a HEARTBEAT method.

The metadata server 10 updates file layout information regarding the devices including the failed data server. That is, the metadata server 10 updates the file layout information of files included in the devices including the failed data server. In this case, the metadata server 10 assigns a new device from which the failed data server has been removed.

The metadata server 10 performs a copying task to meet a desired copying level based on the assigned new device information in order to prepare for the failure of another data server in the corresponding device.

This will be described in detail below with reference to FIGS. 14 and 15.

Data servers 1 DS_1 to 3 DS_3 are involved. The metadata server 10 stores device information set to [{DS_1, DS_2}, {DS_2, DS_3}, {DS_3, DS_1}] with respect to device 1. The metadata server 10 assumes that the file handle value list set to [{a_1, a_2}, {a_2, a_3}, {a_3, a_1}] has been stored with respect to file A 50.

The metadata server 10 detects the failures of the data servers DS_1, DS_2 and DS_3. If a failure has occurred in the data server 2 DS_2 (YES) at step S905, the metadata server 10 removes data server 2 DS_2 from information about device 1 including data server 2 DS_2 at step S910. Accordingly, the metadata server 10 updates the device information stored in device 1 to [{DS_1, INVALID}, {INVALID, DS_3}, {DS_3, DS_1}].

The metadata server 10 promotes a second data server value, that is, a valid value, to a first data server value if the first data server value is an invalid value in the multiplicate data server list of the device information in order to prepare for the write operation of the client 40 that is performed on file A 50 at step S915. Accordingly, the device information stored in device 1 becomes [{DS_1, INVALID}, {DS_3, INVALID}, {DS_3, DS_1}].

The metadata server 10 promotes a second file handle value, that is, a valid value, to a first file handle value if the first file handle value is an invalid value in the multiplicate file handle value of the file handle value list at step S920. Accordingly, the file handle value list of file A 50 becomes [{a_1, INVALID}, {a_3, INVALID}, {a_3, a_1}].

In order to meet copying level 2, the device information is updated and a new device ID value is assigned. That is, the metadata server 10 removes a redundant data server address value from the first data server address values of the multiplicate data server address at step S925. That is, the first data server address values of the multiplicate data server address are {DS_1, DS_3, DS_3}. Here, when a redundant data server address value is removed, {DS_1, DS_3} is obtained.

The metadata server 10 updates the second data server value based on the data server addresses from which the redundant value has been removed at step S930. That is, the metadata server 10 replaces only invalid second multiplicate data server values with immediately subsequent data server values based on the data server address values {DS_1, DS_3} from which the redundant value has been removed, in the same manner as when the initial device is generated. Accordingly, the device information becomes [{DS_1, DS_3}, {DS_3, DS_1}, {DS_3, DS_1}].

The metadata server 10 assigns a new device ID value at step S935. That is, since the device information capable of meeting the copying level 2 has been obtained, the metadata server 10 assigns the new device ID value 2. The metadata server 10 records that the corresponding file (that is, file A 50) has been included in device 2.

Thereafter, when the client 40 desires to perform a write or read operation on file A 50, it sends a LAYOUT_GET request to the metadata server 10. If the metadata server 10 has received a LAYOUT_GET request from the client 40 (YES) at step S940, the metadata server 10 sends a response, including the ID value 2 of the corresponding device and the file handle value list [{a_1, INVALID}, {a_3, INVALID}, {a_3, a_1}], to the client 40 at step S945. At this time, the metadata server 10 sends a response, including the ID value 2 and the file handle value list [{a_1, INVALID}, {a_3, INVALID}, {a_3, a_1}], to the client 40.

Since the client 40 does not have device information about device 2, it sends a DEVICE_INFO request, including the device ID value 2, to the metadata server 10 at step S950. The metadata server 10 sends a response, including information about device 2, to the client 40 in response to the DEVICE_INFO request at step S955. That is, the metadata server 10 sends a response, including the information about device 2, that is, [{DS_1, DS_3}, {DS3, DS_1}, {DS_3, DS_1}], to the client 40.

The client 40 accesses a corresponding data server and then performs a write or read operation on file A 50 based on the received new information at step S960.

Thereafter, the metadata server 10 performs the above-described copying task only on multiplicate data servers requiring copying based on the new device information in order to prepare for the failure of another data server of the corresponding device at step S965.

Figure 16:
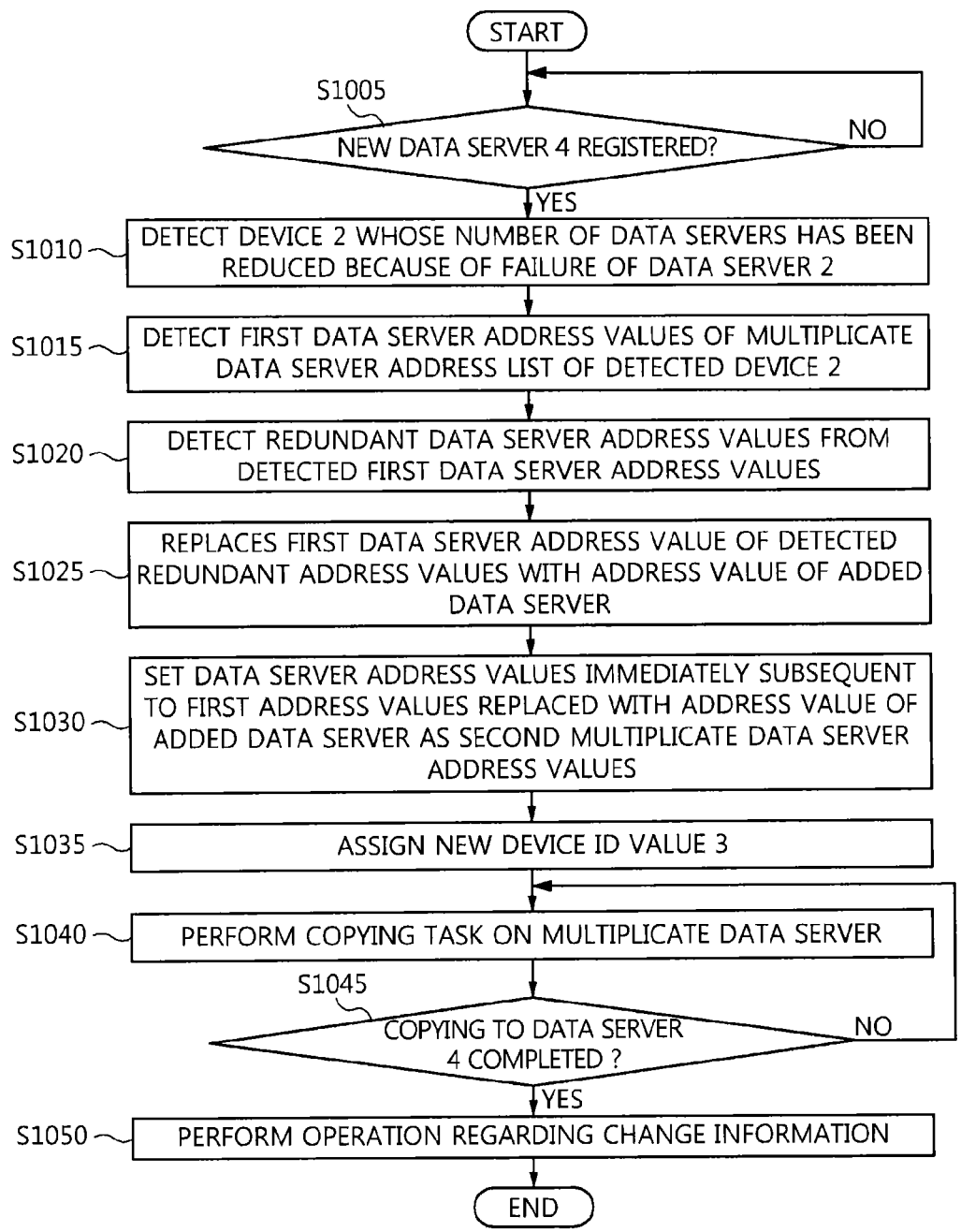
FIG. 16 is a flowchart illustrating a method of updating device information and file layout information when a new data server is added after the failure of a data server has occurred in the asymmetric cluster file system according to an embodiment of the present invention.

FIG. 16 is a flowchart illustrating a method of updating device information and file layout information when a new data server is added after the failure of a data server has occurred in the asymmetric cluster file system according to an embodiment of the present invention. That is, FIG. 16 illustrates the process of restoring a specific device whose number of data servers has been reduced because of the failure of a data server when a new data server has been registered. In this case, if the device is not present any longer, the existing data servers and the newly registered data server may be collectively defined as a new device, and a newly generated file may be assigned to the new device. Whether to apply the restoring process depending on the registration of a new data server may be determined in accordance with a user's policy.

First, it is assumed that the asymmetric cluster file system includes data server 1 DS_1 to data server 3 DS_3 and a failure has occurred in data server 2 DS_2. Furthermore, it is assumed that in device 2, the number of data servers has been reduced because of the failure of data server 2 DS_2.

If new data server 4 DS_4 has been registered (YES) at step S1005, the metadata server 10 detects device 2 whose number of data servers has been reduced because of the failure of data server 2 by means of searching at step S1010. Here, it is assumed that the information of device 2 is [{DS_1, DS_3}, {DS_3, DS_1}, {DS_3, DS_1}].

The metadata server 10 detects the first data server address values {DS_1, DS_3, DS_3} of the multiplicate data server address list of the detected device 2 at step S1015.

The metadata server 10 detects redundant data server address values from the detected first data server address values {DS_1, DS_3, DS_3} at step S1020. That is, the metadata server 10 detects the redundant second and third data server address values.

The metadata server 10 replaces the first data server address value of the detected redundant address values with data server 4 (that is, DS_4) at step S1025. That is, new first data server address values become {DS_1, DS_4, DS_3}. It will be apparent that the metadata server 10 may replace the second data server address value with data server 4 (that is, DS_4), thereby replacing the first data server address values with {DS_1, DS_3, DS_4}.

The metadata server 10 sets data server address values immediately subsequent to the first address values as the second multiplicate data server address values at step S1030. That is, the metadata server 10 determines the immediately subsequent data server address values to be the second multiplicate data server address values in the same manner as when the initial device is generated. Accordingly, the device information becomes [{DS_1, DS_4}, {DS_4, DS_3}, {DS_3, DS_1}].

Since device information capable of meeting copying level 2 has been obtained, the metadata server 10 assigns the new device ID value 3 at step S1035.

The metadata server 10 performs a copying task on the multiplicate data server including the new data server address at step S1040. That is, the metadata server 10 copies data chunks regarding the first and fourth logical chunks of data server 1 DS_1 to data server 4 DS_4. The metadata server 10 copies a data chunk regarding the second logical chunk of the data server 3 DS_3 to data server 3 DS_4. In this case, the file handle value a_4 of copied file a_0 in data server 4 DS_4 may be obtained via a response to the MDS2DS_COPY request.

Once the copying to data server 4 DS_4 has been completed (YES) at step S1045, the metadata server 10 updates the file layout information of the corresponding file A 50 at step S1050. At this time, the metadata server 10 records that the corresponding file A has been included in device 3. Accordingly, the file layout information becomes [{a_1, a_4}, {a_4, a_3}, {a_3, a_1}].

The client 40 performs a write or read operation based on the information newly updated as described above at step S1055.

As described above, the method of managing data in an asymmetric cluster file system according to the present invention is advantageous in that the high availability of data is guaranteed because even when a failure occurs in a data server included in an asymmetric cluster file system in which a data distribution pattern is fixed, data is present in another data server, and in that data parallelism that is deteriorated because of the failure of a data server can be restored when a new data server is added.

Furthermore, the method of managing data in an asymmetric cluster file system according to the present invention is advantageous in that it can prepare for the failures of data servers while complying with the system protocol in an asymmetric cluster file system that supports the file layout-type NFS version 4.1 protocol that provides a file-based environment most familiar to common users, and in that data parallelism that is deteriorated because of the failure of a data server can be restored when a new data server is added.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of managing data in an asymmetric cluster file system, comprising:
   if an OPEN request for opening of an absent file has been received, assigning, by a metadata server, a file handle value and a file name and generating, by the metadata server, a file in a data server;
   copying, by the metadata server, a file stored in the data server or the generated file to another data server based on a preset copying level;
   performing, by a client, a file operation on the files stored in the data servers; and
   adding, by the metadata server, a data server to the asymmetric cluster file system;
   wherein the adding a data server comprises:
   sending, by the data server to be added, a registration request signal, including a data server ID value and an available capacity;
   storing, by the metadata server having received the registration request signal, the data server ID value and the available capacity included in the registration request signal and sending, by the metadata server having received the registration request signal, results of the storage;
   sending, by the data server to be added and having received the results of the storage, a DS2MDS_REPORT signal, including a status value of the current data server;
   storing, by metadata server having received the DS2MDS_REPORT signal, the status value stored in the DS2MDS_REPORT signal; and
   sending, by the metadata server having received a DS2MDS_REPORT signal, a response to the data server to be added.

2. The method of claim 1, further comprising:
   if an OPEN request has been received from the client and a file corresponding to the OPEN request is not present in the metadata server and the data servers, assigning, by the metadata server, a file handle value and file name of the file;
   sending, by the metadata server, an MDS2DS_OPEN request, including the assigned file name, to a plurality of data servers; and
   generating, by the data servers having received the MDS2DS_OPEN request, files using the file name included in the MDS2DS_OPEN request.

3. The method of claim 2, wherein the generating files comprises:
   sending, by the data servers having generated the files, responses, including file handle values of the generated files, to the metadata server; and
   managing, by the metadata server, the file handle values included in the responses received from the plurality of data servers so that they are associated with the assigned file handle value.

4. The method of claim 2, wherein the copying a file stored in the data server or the generated file to another data server comprises:
   detecting, by the metadata server, multiplicate data server addresses corresponding to an n-th data server index value on which a write operation has been performed from information about devices in which a copying target file has been stored;
   sending, by the metadata server, an MDS2DS_COPY request, including a source data server, a target data server, a name of the copying target file and a list of indices of data chunks to be copied, to the source data server and the target data server based on the detected multiplicate data server addresses;
   sending, by the source data server and the target data server having received the MDS2DS_COPY request, responses, including a handle value corresponding to the name included in the MDS2DS_COPY request, to the metadata server;
   copying, by the source data server and the target data server, the file stored in the source data server to the target data server;
   sending, by the source data server and the target data server, a DS2MDS_COPY_DONE request, including information about success or failure of the copying of the file, to the metadata server; and
   updating, by the metadata server, a file handle value list of the copied file.

5. The method of claim 4, wherein the detecting a multiplicate data server address comprises:
   detecting, by the metadata server, a file that does not meet the preset copying level;
   detecting, by the metadata server, a device in which the detected file has been stored;
   detecting, by the metadata server, a file handle value list of the detected file;

detecting, by the metadata server, multiplicate data server addresses included in the detected device; and detecting, by the metadata server, multiplicate file handle values corresponding to the detected multiplicate data server addresses.

6. The method of claim 4, wherein the sending an MDS2DS_COPY request comprises:
   setting, by the metadata server, a data server corresponding to a valid file handle value selected from among the detected multiplicate file handle values as the source data server; and
   setting, by the metadata server, a data server corresponding to an invalid file handle value selected from among the detected multiplicate file handle values as the target data server.

7. The method of claim 1, wherein the performing a file operation comprises:
   receiving, by the client, a multiplicate file handle value list and multiplicate data server addresses from the metadata server;
   detecting, by the client, multiplicate data server addresses and a multiplicate file handle value list corresponding to logical chunks that are selected as operation targets; and
   performing, by the client, an operation on a file based on the detected multiplicate data server addresses and multiplicate file handle value list;
   wherein the performing an operation comprises:
   if the operation is a write operation, detecting, by the client, an n-th data server address, at which the write operation will be performed, from the detected multiplicate data server address list, and an n-th file handle value from the detected multiplicate file handle value list; and
   if the operation is a read operation, detecting, by the client, a valid file handle value from the detected multiplicate file handle value list, and a data server address corresponding to the detected valid file handle value.

8. The method of claim 1, further comprising deleting, by the metadata server, a file stored in the data server in response to a request for deletion of the file from the client;
   wherein the deleting a file comprises:
   detecting, by the metadata server, a file name from a REMOVE request received from the client;
   detecting, by the metadata server, a file name corresponding to the detected file name from each of the data servers;
   sending, by the metadata server, an MDS2DS_REMOVE request, including the detected file name in each of the data servers, to the each of the data servers; and
   integrating, by the metadata server, results of deleting the file received from the each of the data servers and sending, by the metadata server, a response, including final results, to the client.

9. The method of claim 1, further comprising copying a copying target file stored in a source data server to a target data server;
   wherein the copying a copying target file to a target data server comprises:
   sending, by the metadata server, an MDS2COPY request, including source data server information, target data server information, a name of the copying target file, and a list of indices of data chunks to be copied, to the source data server and the target data server;
   sending, by each of the source data server and the target data server having received the MDS2COPY request, a response, including a file handle value of the copying target file in the each of the source data server and the target data server, to the metadata server;
   sending, by the source data server, a DS2DS_OPEN request, including the name of the copying target file, to the target data server;
   opening, by the target data server having received the DS2DS_OPEN request, a file corresponding to the name of the copying target file name included in the DS2DS_OPEN request, and sending, by the target data server having received the DS2DS_OPEN request, a response, including a file handle value of the corresponding file, to the source data server;
   sending, by the source data server having received the response, a DS2DS_WRITE request, including the file handle value received from the target data server and content of data chunks corresponding to the list of the indices of the data chunks to be copied, to the target data server;
   storing, by the target data server having received the DS2DS_WRITE request, the content of the data chunks included in the DS2DS_WRITE request, in a file corresponding to the file handle value included in the DS2DS_WRITE request;
   sending by the target data server, results of storing the content of the data chunks to the source data server;
   sending, by the source data server, a signal indicative of completion of the copying of the data chunks, including file handle values in the source data server and the target data server, to the metadata server; and
   sending, by the metadata server having received the signal indicative of completion of the copying, a response to the source data server and the target data server.

10. The method of claim 1, further comprising generating, by the metadata server, a new file in the data server;
    wherein the generating a new file comprises:
    assigning, by the metadata server having received the OPEN request from the client, a file handle value of the new file and a file name to be used in the data server;
    sending, by the metadata server, an MDS2DS_OPEN request, including the assigned file name, to n-th data servers of a multiplicate data server list selected from among data server lists included in a device;
    generating, by each of the data servers having received the MDS2DS_OPEN request, a file using a file name included in the MDS2DS_OPEN request;
    sending, by the each of the data servers, a file handle value of the generated file to the metadata server; and
    managing, by the metadata server, the received file handle values so that they are associated with the generated file handle values.

11. A method of managing data when a failure occurs in an asymmetric cluster file system, comprising:
    if an OPEN request for opening of an absent file has been received, assigning, by the metadata server, a file handle value and a file name and generating, by the metadata server, a file in a data server;
    copying, by the metadata server, a file stored in the data server or the generated file to another data server based on a preset copying level;
    performing, by a client, a file operation on the files stored in the data servers; and
    adding, by the metadata server, a data server to the asymmetric cluster file system;
    detecting, by a metadata server, a failed data server from among a plurality of data servers;
    updating, by the metadata server, multiplicate data server addresses including the failed data server;
    updating, by the metadata server, a multiplicate file handle value list including the failed data server; and updating, by the metadata server, device information based on the updated multiplicate data server addresses and the updated multiplicate file handle value list, wherein the adding a data server comprises:
sending, by the data server to be added, a registration request signal, including a data server ID value and an available capacity;
storing, by the metadata server having received the registration request signal, the data server ID value and the available capacity included in the registration request signal and sending, by the metadata server having received the registration request signal, results of the storage;
sending, by the data server to be added and having received the results of the storage, a DS2MDS_REPORT signal, including a status value of the current data server;
storing, by metadata server having received the DS2MDS_REPORT signal, the status value stored in the DS2MDS_REPORT signal; and
sending, by the metadata server having received a DS2MDS_REPORT signal, a response to the data server to be added; and
wherein the updating a multiplicate file handle value list comprises:
detecting, by the metadata server, a device including the failed data server;
detecting, by the metadata server, a multiplicate file handle value list including a file handle value of the detected data server from device information of the detected device; and
updating, by the metadata server, a file handle value corresponding to the detected data server in the detected multiplicate file handle value list, to an invalid value.

12. The method of claim 11, wherein the updating multiplicate data server addresses comprises:
detecting, by the metadata server, a device including the failed data server;
detecting, by the metadata server, the multiplicate data server addresses including an address of the detected data server from device information of the detected device; and
updating, by the metadata server, the detected address of the data server selected from among the detected multiplicate data server addresses to an invalid value.

13. The method of claim 11, wherein the updating device information comprises:
reconfiguring, by the metadata server, the device information by replacing a valid value of the multiplicate data server addresses in which an n-th value on which a write operation will be performed has been updated to an invalid value in the multiplicate data server addresses, with the n-th value;
reconfiguring, by the metadata server, the device information by replacing a valid value of multiplicate file handle values in which an n-th value has been updated to an invalid value in the multiplicate file handle value list, with the n-th value;
assigning, by the metadata server, a device ID value of the reconfigured device information; and
updating, by the metadata server, a device ID value of each file, including a device corresponding to the assigned device ID value, to the assigned device ID value.

14. The method of claim 11, further comprising updating, by the metadata server, the device information based on an added data server;

wherein the updating the device information based on an added data server comprises:
detecting, by the metadata server, addition of the data server;
detecting, by the metadata server, a device whose number of data servers has be reduced because of a failure of a data server;
detecting, by the metadata server, n-th data server address values on which a write operation will be performed, from a multiplicate data server list included in device information of the detected device;
detecting, by the metadata server, redundant data server address values from the detected n-th data server address values;
replacing, by the metadata server, n-th data server address values of the redundant data server address values with a data server address value of the added data server;
reconfiguring, by the metadata server, (n+1)-th data server address values of the multiplicate data server list based on the resulting n-th data server address values; and
assigning, by the metadata server, a device ID of the reconfigured device information.

15. The method of claim 14, wherein the reconfiguring an (n+1)-th data server address value comprises reconfiguring, by the metadata server, the (n+1)-th data server address values so that data server address values immediately subsequent to the resulting n-th data server address values are set as the (n+1)-th data server address values.

16. The method of claim 14, further comprising copying, by the metadata server, files to the added data server based on the updated device information;
wherein the copying a file to the added data server comprises:
detecting, by the metadata server, multiplicate data servers, including a data server address of the added data server;
setting, by the metadata server, one of the detected multiplicate data servers as a source data server;
setting, by the metadata server, the added data server as a target data server; and
copying, by the metadata server, files stored in the source data server to the target data server.

17. The method of claim 16, wherein:
the copying files to the target data server comprises copying data chunks to the target data server; and
the copying data chunks to the target data server comprises:
detecting, by the metadata server, logical chunks of the files that are managed by the source data server;
sending, by the metadata server, a request for copying data chunks corresponding to the detected logical chunks to the source data server and the target data server;
detecting, by the metadata server, a file handle value corresponding to the added data server from a response to the request for copying received from the target data server; and
updating, by the metadata server, a file handle value of file layout information of the files corresponding to the added data server with the detected file handle value.

18. The method of claim 17, wherein the copying data chunks to the target data server further comprises updating, by the metadata server, a device ID value of the copied files with the device ID value.

* * * * *